United States Patent
Nikaido et al.

(10) Patent No.: US 9,021,078 B2
(45) Date of Patent: Apr. 28, 2015

(54) MANAGEMENT METHOD AND MANAGEMENT SYSTEM

(75) Inventors: Akira Nikaido, Yokohama (JP); Hideo Takahashi, Yokohama (JP); Takeshi Arisaka, Yokohama (JP); Takumi Tomita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 13/581,954

(22) PCT Filed: May 16, 2012

(86) PCT No.: PCT/JP2012/062554
§ 371 (c)(1),
(2), (4) Date: Aug. 30, 2012

(87) PCT Pub. No.: WO2013/171865
PCT Pub. Date: Nov. 21, 2013

(65) Prior Publication Data
US 2013/0311646 A1 Nov. 21, 2013

(51) Int. Cl.
*G06F 15/16* (2006.01)
*G06Q 10/00* (2012.01)
*G06F 12/00* (2006.01)

(52) U.S. Cl.
CPC ..................................... *G06Q 10/20* (2013.01)

(58) Field of Classification Search
USPC ................. 709/203, 223–229, 250
See application file for complete search history.

(56) References Cited

U.S. PATENT DOCUMENTS

| | | | |
|---|---|---|---|
| 6,993,456 B2 * | 1/2006 | Brooks et al. | 702/183 |
| 8,271,492 B2 * | 9/2012 | Nagai et al. | 707/736 |
| 2002/0120921 A1 * | 8/2002 | Coburn et al. | 717/140 |
| 2009/0271667 A1 | 10/2009 | Onitsuka et al. | |
| 2011/0246835 A1 * | 10/2011 | Hasegawa et al. | 714/39 |
| 2012/0304007 A1 * | 11/2012 | Hanks et al. | 714/26 |

FOREIGN PATENT DOCUMENTS

| | | | |
|---|---|---|---|
| JP | 2002-341930 A | 11/2002 | |
| JP | 2009-265785 A | 11/2009 | |
| JP | 2010-211619 A | 9/2010 | |

OTHER PUBLICATIONS

PCT International Search Report on application PCT/JP2012/062554 mailed Jul. 24, 2012; 2 pages.
PCT Written Opinion on application PCT/JP2012/062554 mailed Jul. 24, 2012; 4 pages.

* cited by examiner

*Primary Examiner* — Zarni Maung
(74) *Attorney, Agent, or Firm* — Foley & Lardner LLP

(57) ABSTRACT

The management system identifies a first event regarding a first node apparatus estimated to occur when a first maintenance work is performed on a first node apparatus based on maintenance work information that indicates a correspondence relationship between each maintenance work of one or more maintenance works for any of the plurality of node apparatuses and an event regarding a node apparatus to be the target of each maintenance work, which is estimated to occur when the maintenance work is performed. The management system identifies the range of effect and phenomenon of the case where the first maintenance work is performed on the first node apparatus, by performing simulation based on one or more rules indicating a correspondence relationship between one or more conditional events and a causal event and displays the identified range of effect and phenomenon.

7 Claims, 25 Drawing Sheets

Fig. 7A (1) HDD

| COMPONENT NAME | COMPONENT TYPE | NODE NAME | DISK CAPACITY | STATUS | UPDATE DATE AND TIME |
|---|---|---|---|---|---|
| DISK1 | DISK | SERVER1 | 500GB | NORMAL | 2012/1/26 10:13:34 |
| DISK2 | DISK | SERVER2 | 200GB | NORMAL | 2012/1/23 15:3:52 |
| DISK3 | DISK | SERVER3 | 300GB | ERROR | 2011/12/11 22:33:4 |
| SCSIDISK1 | SCSIDISK | STORAGE1 | 1TB | NORMAL | 2012/1/17 8:18:47 |
| SCSIDISK2 | SCSIDISK | STORAGE2 | 2TB | ERROR | 2012/1/26 10:13:34 |

Fig. 7B (2) CPU

| COMPONENT NAME | COMPONENT TYPE | NODE NAME | CLOCK FREQUENCY | STATUS | UPDATE DATE AND TIME |
|---|---|---|---|---|---|
| CPU1 | CPU | SERVER1 | 2.5GHz | NORMAL | 2012/1/26 10:13:34 |
| CPU2 | CPU | SERVER2 | 3GHz | NORMAL | 2012/1/23 15:3:52 |
| CPU3 | CPU | SERVER3 | 2GHz | NORMAL | 2011/12/11 22:33:4 |

Fig. 7C (3) POWER

| COMPONENT NAME | COMPONENT TYPE | NODE NAME | STATUS | UPDATE DATE AND TIME |
|---|---|---|---|---|
| POWERSUPPLY1 | POWERSUPPLY | FC-SW1 | NORMAL | 2012/1/26 10:13:34 |
| POWERSUPPLY2 | POWERSUPPLY | FC-SW2 | NORMAL | 2012/1/23 15:3:52 |
| POWERSUPPLY3 | POWERSUPPLY | FC-SW2 | ERROR | 2011/12/11 22:33:4 |
| POWERSUPPLY4 | POWERSUPPLY | FC-SW3 | NORMAL | 2012/1/17 8:18:47 |

Fig. 8

| TOPOLOGY ID | NODE NAME | ASSOCIATED NODE NAME |
|---|---|---|
| 0001 | SERVER1 | FC-SW1 |
| 0002 | SERVER2 | FC-SW1 |
| 0003 | SERVER2 | FC-SW2 |
| 0004 | SERVER3 | FC-SW3 |
| 0005 | FC-SW1 | SERVER1 |
| 0006 | FC-SW1 | SERVER2 |
| 0007 | FC-SW1 | STORAGE1 |
| 0008 | FC-SW2 | SERVER2 |
| 0009 | FC-SW2 | STORAGE1 |
| 0010 | FC-SW3 | SERVER3 |
| 0011 | FC-SW3 | STORAGE2 |
| 0012 | STORAGE1 | FC-SW1 |
| 0013 | STORAGE1 | FC-SW2 |
| 0014 | STORAGE2 | FC-SW3 |

Fig. 9

| EVENT ID | NODE TYPE | COMPONENT TYPE | EVENT TYPE | EVENT CONTENT |
|---|---|---|---|---|
| 0001 | SERVER | DISK | SERVER EVENT | DISK UNMOUNT |
| 0002 | SERVER | POWERSUPPLY | SERVER EVENT | POWER OFF |
| 0003 | SERVER | — | SERVER EVENT | SERVER STOP |
| 0004 | SERVER | — | SERVER EVENT | UNREACHABLE |
| 0005 | SERVER | DISK | SERVER EVENT | DISK I/O ERROR |
| 0006 | SERVER | HBA | SERVER EVENT | HBA PORT LINK DOWN |
| 0007 | SERVER | DISK | SERVER EVENT | DISK I/O INCREASE |
| 0011 | STORAGE | SCSIDISK | STORAGE EVENT | RAID GROUP STOP |
| 0012 | STORAGE | POWERSUPPLY | STORAGE EVENT | POWER OFF |
| 0013 | STORAGE | — | STORAGE EVENT | STORAGE STOP |
| 0014 | STORAGE | — | STORAGE EVENT | UNREACHABLE |
| 0015 | STORAGE | CONTROLLER | STORAGE EVENT | DISK CONTROLLER CPU USAGE RATIO INCREASE |
| 0016 | STORAGE | SCSIDISK | STORAGE EVENT | DISK I/O INCREASE |
| 0021 | FC-SW | FCPORT | SWITCH EVENT | LINK DOWN |
| 0022 | FC-SW | POWERSUPPLY | SWITCH EVENT | POWER OFF |
| 0023 | FC-SW | — | SWITCH EVENT | FC SWITCH STOP |
| 0024 | FC-SW | — | SWITCH EVENT | UNREACHABLE |
| 0025 | FC-SW | FCPORT | SWITCH EVENT | PORT FAILURE |

| META RULE ID (1731) | EVENT ID (SERVER) (1732) | EVENT ID (SWITCH) (1733) | EVENT ID (STORAGE) (1734) | CAUSAL NODE TYPE (1735) | CAUSAL EVENT ID (1736) |
|---|---|---|---|---|---|
| 0001 | 0005 | 0021 | — | FC-SW | 0024 |
| 0002 | 0005 | — | 0014 | Storage | 0014 |
| 0003 | 0006 | 0021 | — | FC-SW | 0025 |
| 0004 | 0007 | — | 0015 | Storage | 0015 |
| 0005 | 0007 | — | 0016 | Storage | 0016 |
| 0006 | 0005 | 0021 | — | FC-SW | 0022 |
| 0007 | 0005 | — | 0014 | Storage | 0013 |

| EXPANSION RULE ID (1741) | META RULE ID (1742) | TOPOLOGY ID (1743) | | | | | CAUSAL NODE NAME (1744) | CAUSAL EVENT ID (1745) |
|---|---|---|---|---|---|---|---|---|
| 0001 | 0001 | 0005 | 0006 | | | | FC-SW1 | 0024 |
| 0002 | 0002 | 0012 | 0013 | 0005 | 0006 | 0008 | STORAGE1 | 0014 |
| 0003 | 0003 | 0010 | 0011 | | | | FC-SW3 | 0025 |
| 0004 | 0004 | 0014 | 0010 | | | | STORAGE2 | 0015 |
| 0005 | 0005 | 0014 | 0010 | | | | STORAGE2 | 0016 |
| 0006 | 0006 | 0008 | 0009 | | | | FC-SW2 | 0022 |
| 0007 | 0007 | 0014 | 0010 | | | | STORAGE2 | 0013 |

Fig. 12

| RECEIVED EVENT ID | NODE NAME | COMPONENT NAME | EVENT ID | EVENT RECEPTION DATE AND TIME |
|---|---|---|---|---|
| 0001 | SERVER1 | DISK1 | 0001 | 2012/1/26 10:13:34 |
| 0002 | SERVER2 | DISK2 | 0005 | 2012/1/23 15:3:52 |
| 0003 | SERVER3 | — | 0003 | 2011/12/11 22:33:4 |
| 0004 | STORAGE1 | POWERSUPPLY | 0012 | 2012/1/17 8:18:47 |
| 0005 | STORAGE2 | — | 0013 | 2012/1/26 10:13:34 |

(1)HDD (2)CPU

Fig. 14

| NODE TYPE | VENDOR | MODEL | COMPONENT TYPE | MAINTENANCE WORK | EVENT ID | ASSOCIATED EVENT ID |
|---|---|---|---|---|---|---|
| Server | a | ABC | DISK | DISK UNMOUNT | 0001 | — |
| Server | a | ABC | — | SERVER STOP | 0003 | 0001, 0002 |
| Server | b | DEF | DISK | DISK UNMOUNT | 0001 | — |
| Server | b | DEF | — | SERVER STOP | 0003 | 0001, 0002 |
| Storage | a | JKL | — | STORAGE STOP | 0013 | 0011, 0012 |
| Storage | a | JKL | POWERSUPPLY | POWER EXCHANGE | — | — |
| Storage | a | JKL | SCSIDISK | DISK EXCHANGE | — | — |
| Storage | a | JKL | FIRMWARE | FIRMWARE UPDATE | — | — |
| Storage | c | MNO | — | STORAGE STOP | 0013 | 0011, 0012 |
| Storage | c | MNO | POWERSUPPLY | POWER EXCHANGE | 0012 | 0011 |
| Storage | c | MNO | SCSIDISK | DISK EXCHANGE | — | — |
| Storage | c | MNO | FIRMWARE | FIRMWARE UPDATE | 0013 | 0011, 0012 |
| FC-SW | d | PQR | FCPORT | PORT EXCHANGE | 0021 | — |
| FC-SW | d | PQR | POWERSUPPLY | POWER EXCHANGE | 0022 | 0021 |
| FC-SW | d | PQR | — | FC-SW STOP | 0023 | 0021, 0022 |
| FC-SW | e | STU | FCPORT | PORT EXCHANGE | 0021 | — |
| FC-SW | e | STU | POWERSUPPLY | POWER EXCHANGE | — | — |
| FC-SW | e | STU | — | FC-SW STOP | 0023 | 0021, 0022 |
| FC-SW | f | VWX | FCPORT | PORT EXCHANGE | — | — |
| FC-SW | f | VWX | POWERSUPPLY | POWER EXCHANGE | — | — |
| FC-SW | f | VWX | — | FC-SW STOP | 0023 | 0021, 0022 |

Fig. 15

| MAINTENANCE WORK | EVENT ID | ASSOCIATED EVENT ID |
|---|---|---|
| PORT EXCHANGE | 0021 | — |
| POWER EXCHANGE | 0022 | 0021 |
| FC-SW STOP | 0023 | 0021, 0022 |

MANAGEMENT METHOD AND MANAGEMENT SYSTEM

TECHNICAL FIELD

The present invention relates to a management system that performs management of a computer system and a management method therefor.

BACKGROUND ART

Conventionally, a management system is known that monitors node apparatuses that constitute a computer system (for example, storage apparatuses, server apparatuses, network apparatuses, etc.), detects a phenomenon (hereafter "event") such as a failure or status change having occurred in the computer system and notifies the occurrence of the event to a system administrator. Further, for an event having occurred in the management system due to an intentional stop of node apparatuses (for example, a stop due to maintenance work), since the cause of the event is obvious and it is considered that there is no necessity for the system administrator to check the cause, a technique is known to not provide an alert notification for the system administrator.

For example, Patent Literature 1 discloses a system monitoring apparatus that identifies an intentionally stopped system component or monitoring-target and another monitoring-target (dependent target) that is dependent thereon, and does not execute an alert when an error state is detected for a monitoring-target in a system component that is intentionally stopped or an intentionally stopped monitoring-target and a dependent target on the system component or monitoring-target.

CITATION LIST

Patent Literature

[Patent Literature 1]
Japanese Patent Laid-open No. 2009-265785

SUMMARY OF INVENTION

Technical Problem

A system monitoring apparatus disclosed in Patent Literature 1 identifies a node apparatus (hereafter referred to as "dependent apparatus") that is dependent on an intentionally stopped node apparatus (hereafter referred to as "stopped apparatus") based on a connection relationship among node apparatuses that constitute the computer system. More specifically, the system monitoring apparatus identifies a node apparatus having a connection relationship with stopped apparatus as a dependent apparatus. Then, the system monitoring apparatus is configured not to provide an alert notification to the system administrator for events regarding the stopped apparatus and the dependent apparatus.

In this way, the system monitoring apparatus disclosed in Patent Literature 1 identifies the node apparatus having the connection relationship with the stopped apparatus as a dependent apparatus and does not uniformly provide an alert notification for events regarding the dependent apparatuses. However, it cannot be said that those events regarding node apparatuses having connection relationships with stopped apparatuses necessarily are events caused due to the intentional stop of the stopped apparatus, and even with the node apparatus having the connection relationship with the stopped apparatus, it is desirable that an event whose cause does not involve the intentional stop of the stopped apparatus is notified to the system administrator since there is necessity to check the cause.

Further, if the system administrator in advance knows which kind of event would occur due to the intentional stop of the stopped apparatus, it is possible to easily determine whether the notified event is one that needs checking or one that does not needs checking (an event for which the cause is obvious) so that addressing the notified event will become easy.

The above-stated problem is applicable not solely to the stop of the node apparatus but also to maintenance works that may cause an event regarding a node apparatus or component performed on node apparatuses or components provided for the node apparatuses (for example, disk exchange for a storage device, firmware updating of a storage device, or power source replacement for a server device, etc.).

Solution to Problem

The management system identifies a first event regarding a first node apparatus estimated to occur when a first maintenance work is performed on a first node apparatus based on maintenance work information that indicates correspondence relationship between each maintenance work of one or more maintenance works for any of the plurality of node apparatuses and, event regarding a node apparatus to be the target of each maintenance work, which is estimated to occur when the maintenance work is performed. The management system identifies the range of effect and phenomenon of the case where the first maintenance work is performed on the first node apparatus, by performing simulation based on one or more rules indicating a correspondence relationship between one or more conditional events regarding any one of a plurality of node apparatuses and a causal event regarding any one of the plurality of node apparatuses to be the cause in the case where the one or more conditional events have occurred, to thereby identify another event that occurs in the case where first event occurs and displays identified range of effect and phenomenon.

BRIEF DESCRIPTION OF DRAWINGS

FIG. 1 is a schematic diagram showing one example of computer system according to an embodiment.
FIG. 2 is a schematic diagram showing one example of a client terminal according to an embodiment.
FIG. 3 is a schematic diagram showing one example of a server apparatus according to an embodiment.
FIG. 4 is a schematic diagram showing one example of a storage apparatus according to an embodiment.
FIG. 5 is a schematic diagram showing one example of a network apparatus according to an embodiment.
FIG. 6 is a schematic diagram showing one example of node information according to an embodiment.
[FIG. 7A]
FIG. 7A is a schematic diagram of a first example of component information according to an embodiment.

[FIG. 7B]

FIG. 7B is a schematic diagram according to a second example of component information according to an embodiment.

[FIG. 7C]

FIG. 7C is a schematic diagram according to a third example of component information according to an embodiment.

[FIG. 8]

FIG. 8 is a schematic diagram showing topology information according to an embodiment.

[FIG. 9]

FIG. 9 is a schematic diagram showing one example of event definition information according to an embodiment.

[FIG. 10]

FIG. 10 is a schematic diagram showing one example of meta rule information according to an embodiment.

[FIG. 11]

FIG. 11 is a schematic diagram showing one example of expansion rule information according to an embodiment.

[FIG. 12]

FIG. 12 is a schematic diagram showing one example of receiving event information according to an embodiment.

FIG. 13A is a schematic diagram showing a first example of performance information according to an embodiment.

FIG. 13B is a schematic diagram of a second example of performance information according to an embodiment.

[FIG. 14]

FIG. 14 is a schematic diagram showing one example of maintenance work definition table according to an embodiment.

[FIG. 15]

FIG. 15 is a schematic diagram showing one example of filtering information according to an embodiment.

FIG. 16 is a flowchart showing apparatus finding process according to an embodiment.

FIG. 17 is a flowchart showing configuration information acquisition process according to an embodiment.

FIG. 18 is a flowchart of an event reception process according to an embodiment.

FIG. 19 is a flowchart of performance information acquisition process according to an embodiment.

FIG. 20 is a flowchart of rule expansion process according to embodiment.

FIG. 21 is a flowchart of a root cause analyzing process according to an embodiment.

FIG. 22 is a flowchart of filtering information generating process according to embodiment according to an embodiment.

[FIG. 22]

FIG. 24 is a flowchart of range of effect identification process according to an embodiment.

FIG. 25 is a flowchart of simulation process according to embodiment.

FIG. 26 is a schematic diagram showing one example of a first selection acceptance screen according to an embodiment.

FIG. 27 is a schematic diagram showing one example of a second selection acceptance screen according to an embodiment.

FIG. 28 is a simulation result screen according to an embodiment.

DESCRIPTION OF EMBODIMENTS

The embodiments will be described with reference to the drawings. The embodiments described below do not limit the invention recited in the claims, and not all single entities or combinations of the elements described therein are always requisite for means for solving problems of the present invention. In these drawings, same reference numbers are adhered to elements that are same through a plurality of drawings.

Although in the explanations hereafter, information of the present invention is described by expressions including "table aaa", etc., such information may be expressed a data structure other than a table, a list, a DB, a queue, etc. Therefore, in order to show the independence from the data structure, "table aaa", etc. may be referred to as "aaa information".

Further, on explaining each kind of information content, expressions including "identification information", "identifier", "name", "title" and "ID" are used. However, these may be exchangeable with each other.

In the explanation hereafter, there are some places where the explanation is given with "program" as a grammatical subject. However, since a program performs predetermined processes by using a memory and a communication port by being executed by a processor, it is possible to employ an explanation in which the processor is referred to as a grammatical subject. Further, processes disclosed with a program as a grammatical subject may be processes performed by a computer such as a management apparatus, etc. Further, a part or whole of the program may be implemented by a dedicated hardware. Further, the various programs may be installed to each computer by a program distribution server or, computer-readable recording medium.

Hereafter, a set of one or more computers that manage a computer system and displays for-display information of the present invention may be called as a management system. Where the management apparatus displays the for-display information, the management apparatus is a management system. Further, a combination of management apparatus and display apparatus is a management system. Further, processes equivalent to the management apparatus may be implemented by a plurality of computers for acceleration and enhanced reliability in the management process. In this case the plurality of computers (including a display apparatus where the display apparatus performs displaying) are the management system.

Further, the action of "displaying" by the management system may be any of an action in which the first computer of the management system displays a screen, etc. on the display device of the first computer, and an action of transmission of the for-display information, etc. including the screen on which the information is displayed on the display device of a second computer having the display device. The second computer can display, when receiving the for-display information, screen components, etc. represented by the for-display information on the display device.

Figure 1:
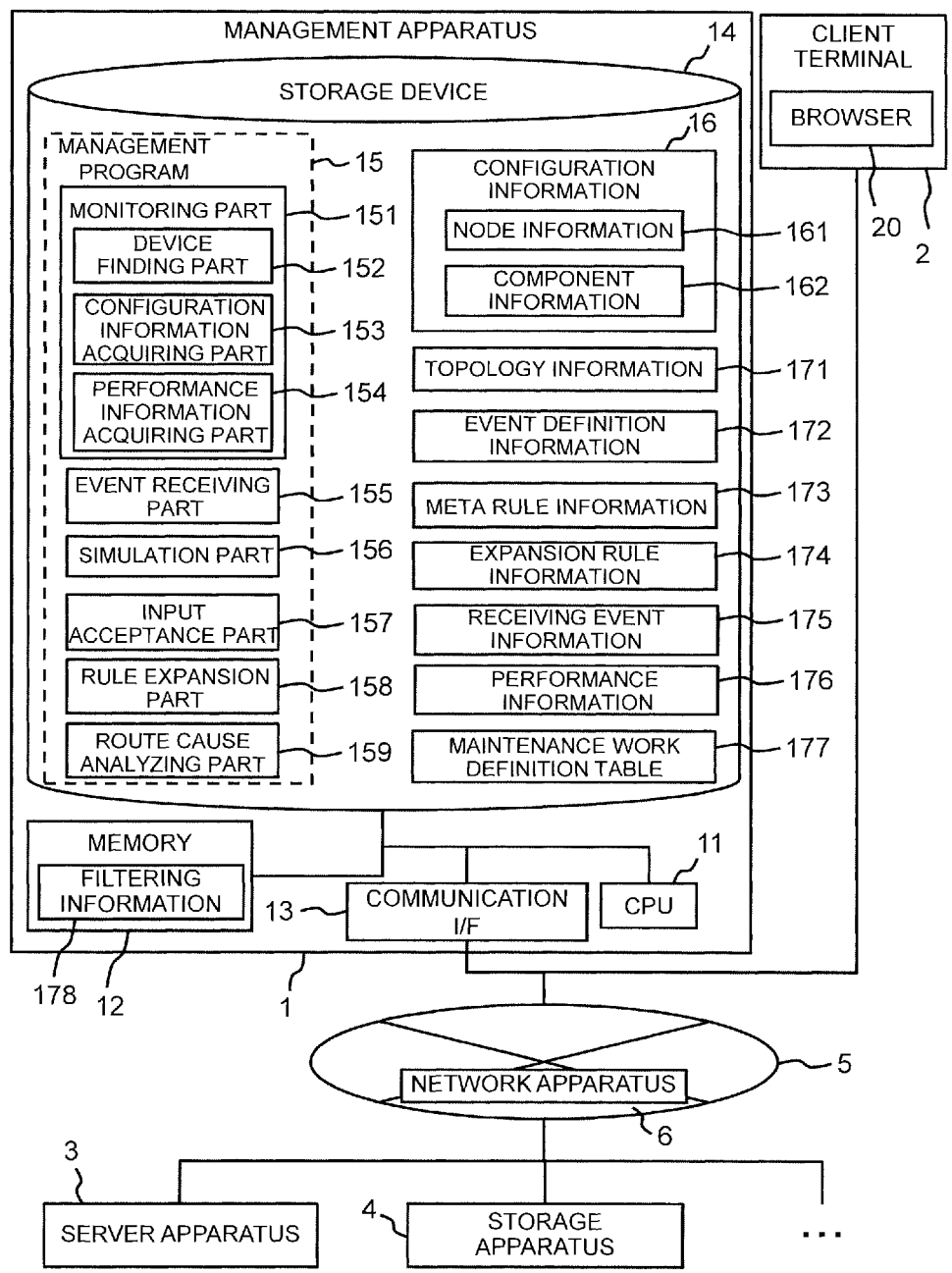
[FIG. 1]

FIG. 1 is a schematic diagram showing one example of a computer system according to an embodiment.

The computer system comprises a management apparatus 1, a client terminal 2 that is one example of the display apparatus, one or more server apparatuses 3, one or more storage apparatuses 4, and a communication network 5. The communication network 5 may be a SAN (Storage Area Network), LAN (Local Area Network), or a network including SAN and LAN, or maybe a network of the another communication scheme. The communication network 5 includes one or more network apparatuses 6. The management apparatus 1, the client terminal 2, the server apparatus 3 and the storage apparatus 4 are interconnected via a communication network 5. In the present embodiment, the management apparatus 1 and client terminal 2 constitute the management system.

Hereafter, the apparatus (server apparatus 3, storage apparatus 4, network apparatus 6, etc.) constituting the computer system may be called as a "node apparatus". The computer system may comprise, for example, a host computer, NAS (Network Attached Storage), file server, printer, etc. as node apparatuses. Further, logical or physical construction, etc. of the device which the node apparatus has may be called a "component". Examples of the component includes a CPU (Central Processing Unit), a memory, a communication I/F (interface), a storage device, a program, virtual machine, a volume defined in a storage device 4, a RAID (Redundant Arrays Of Inexpensive disks) group, etc.

The management apparatus 1 is a computer that performs management of the computer system. The management apparatus 1 comprises a CPU 11, a memory 12, a communication I/F 13, a storage device 14, and an internal bus. The CPU 11, the memory 12, the communication I/F 13, and the storage device 14 are interconnected with each other via an internal bus. The CPU 11 executes a management program 15 stored in the storage device 14. The storage device 14 may be a semiconductor storage device, a secondary storage device including a Hard Disk Drive (HDD), etc. or may be a combination of the semiconductor storage device and secondary storage device. The storage device 14 stores a management program 15 executed by the CPU 11, and the various information used by the CPU 11. The communication I/F 13 is an interface device for connecting to the communication network 5.

The storage device 14 stores a management program 15, configuration information 16, topology information 171, event definition information 172, meta rule information 173, expansion rule information 174, receiving event information 175, performance information 176, maintenance work definition table 177. The topology information 171 is information indicating a connection relationship among a plurality of node apparatuses (connection relationship information). The maintenance work definition table 177 is information (maintenance work information) indicating the correspondence relationship between each maintenance work of one or more maintenance works for any of the plurality of node apparatuses and an event regarding a node apparatus to be the target of each maintenance work, which is estimated to occur when the maintenance work is performed. The management program 15 includes a monitoring part 151, an event receiving part 155, a simulation part 156, an input acceptance part 157, a rule expansion part 158, and a route cause analyzing part 159. The monitoring part 151 includes an apparatus finding part 152, a configuration information acquiring part 153, and a performance information acquiring part 154. The configuration information 16 includes node information 161 and component information 162. The memory 12 stores the filtering information 178. Details of the processes implemented by the management program 15 and the various pieces of information 16, 171-178 stored in the storage device 14 and the memory 12 will be described later.

Figure 2:
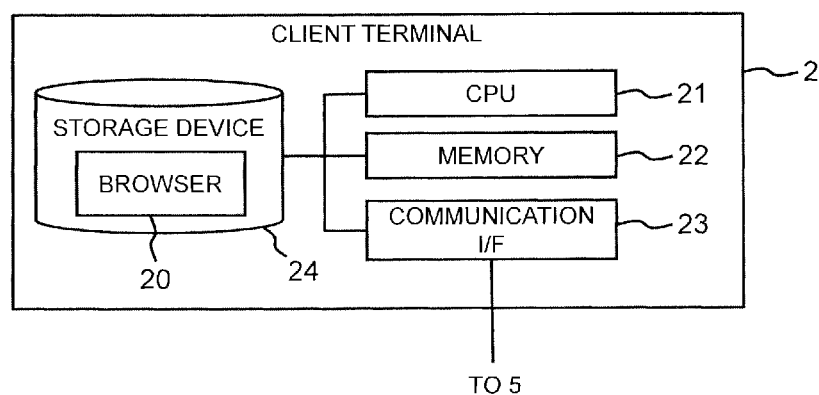
[FIG. 2]

FIG. 2 is a schematic diagram showing one example of the client terminal according to an embodiment.

The client terminal 2 is a computer that inputs input information accepted from the system administrator to the management apparatus 1, and displays for-display information received from the management apparatus 1. The client terminal 2 comprises a CPU 21, a memory 22, a communication I/F 23, a storage device 24, an input device (not shown), an output device (not shown), and an internal bus. The CPU 21, the memory 22, the communication I/F 23, the storage device 24, the input device, and the output device are interconnected via the internal bus. The storage device 24 may be a semiconductor storage device, a secondary storage device including a HDD, etc. or may be a combination of the semiconductor storage device and the secondary storage device. The storage device 24 stores a browser 20 for displaying the for-display information on the output device. The CPU 21 executes a browser 20 stored in the storage device 24. The communication I/F 23 is an interface device for connecting to the communication network 5. The input device is a device for the system administrator to input information, for example, a keyboard, a mouse, etc. The output device is a device for outputting the result of the processes, etc., for example, a display, etc.

Figure 3:
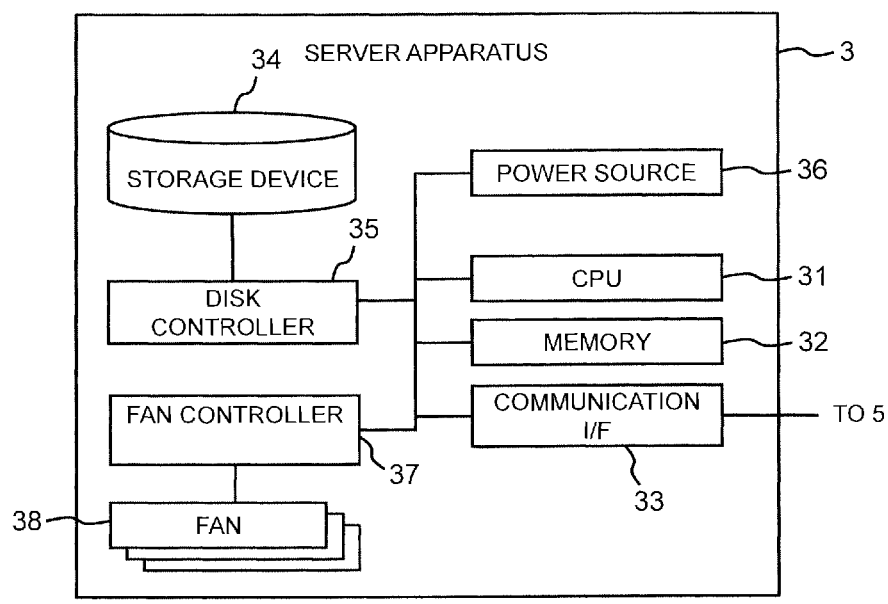
[FIG. 3]

FIG. 3 is a schematic diagram showing one example of the server apparatus according to the embodiment.

The server apparatus 3 is a computer that executes a server program, etc. for providing predetermined services to users. The server apparatus 3 may be a physical server or may be a virtual server that operates one or more virtual machines. The server apparatus 3 comprises a CPU 31, a memory 32, a communication I/F 33, a storage device 34, a disk controller 35, a power source 36, a fan controller 37, one or more fans 38, and an internal bus. The CPU 31, the memory 32, the communication I/F 33, the disk controller 35, the power source 36, and fan controller 37 are interconnected via the internal bus. The storage device 34 is connected to the disk controller 35, and the fan 38 is connected to the fan controller 37. In the present embodiment, the storage device 34 is a HDD that is one example of the secondary storage device. However, the storage device is not limited to a HDD and may be a semiconductor storage device or a combination of the semiconductor storage device and the secondary storage device. The disk controller 35 is a device that performs control of input/output (I/O) of data to and from the storage device 34. The fan controller 37 is a device that performs control of the fan 38. The communication I/F 33 is an interface device for connecting to the communication network 5.

Figure 4:
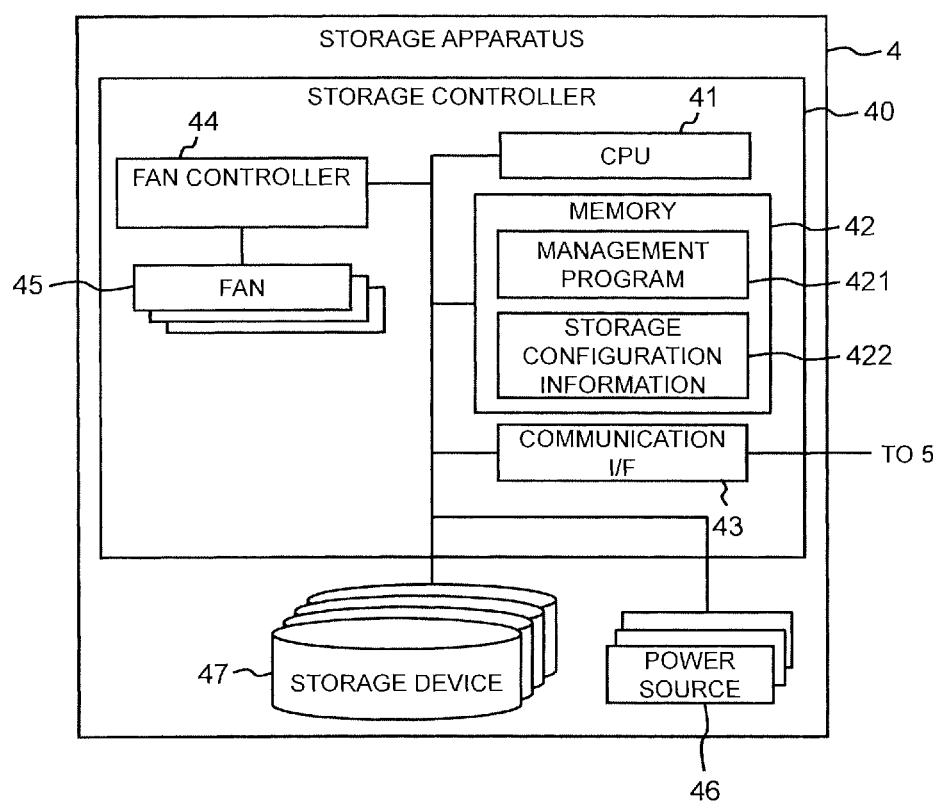
[FIG. 4]

FIG. 4 is a schematic diagram showing one example of a storage apparatus according to the embodiment.

The storage apparatus 4 is an apparatus that provides a volume that is a storage area to the server apparatus 3, etc. The storage apparatus 4 comprises a CPU 41, a memory 42, a communication I/F 43, a fan controller 44, one or more fans 45, one or more power sources 46, one or more storage devices 47, and an internal bus. The CPU 41, the memory 42, the communication I/F 43, the fan controller 44, the power source 46, and the storage device 47 are interconnected via the internal bus. T the fan controller 44 is connected the fan 46. In the present embodiment, although the storage device 47 is a HDD, it is not limited to a HDD but may be another kind of storage medium including a solid state storage device, optical storage medium, etc. One or more RAID group is constituted by the one or more storage devices 47, and a volume is generated based on storage areas on the storage devices 47 constituting the RAID group 26. The fan controller 44 is a device that performs control of fan 45. The communication I/F 43 is an interface device to connect to the communication network 5.

The memory 42 stores a management program 421 and storage configuration information 422. The management program 421 is a program that performs management of the storage apparatus 4. The storage configuration information 422 is information for managing configuration of the storage apparatus 4, that is, information for managing the internal configuration of the storage apparatus 4, connection relationship between a storage apparatus 4 and another node apparatus, etc. The CPU 41 executes a management program 421 stored in the memory 42.

Figure 5:
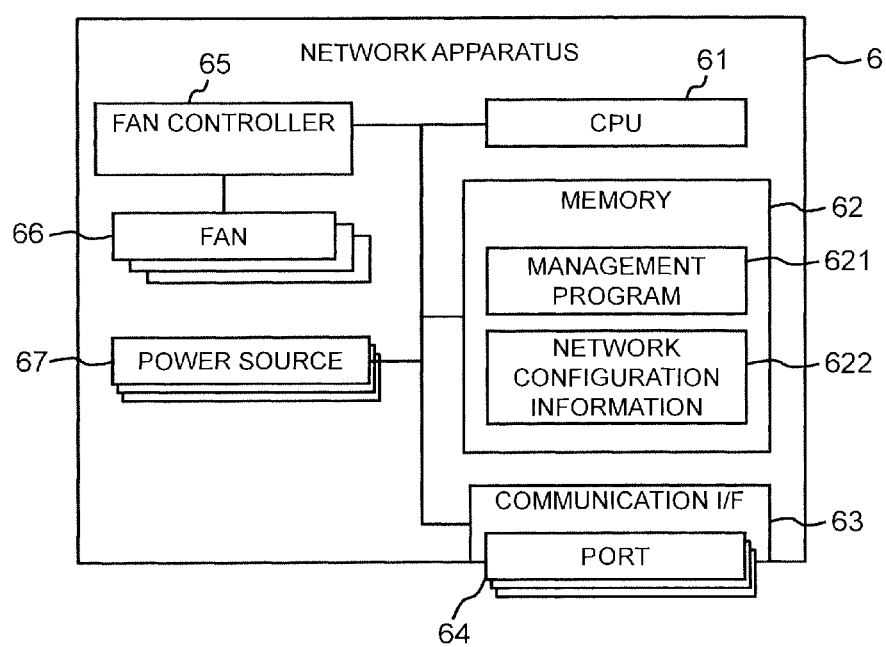
[FIG. 5]

FIG. 5 is a schematic diagram showing one example of the network apparatus according to an embodiment.

The network apparatus 6 is, for example, an FC (Fibre Channel) switch, router, etc. The network apparatus 6 comprises a CPU 61, a memory 62, a communication I/F 63, a fan controller 65, one or more fans 66, one or more power source 67, and an internal bus. The CPU 61, the memory 62, the communication I/F 63, the fan controller 65, and the power source 67 are interconnected via the internal bus. To the fan controller 65 is connected the fan 66. The fan controller 65 is a device that performs control of the fan 66. The communication I/F 63 is an interface device for connecting to a communication cable constituting the communication network 5. The communication I/F 63 includes one or more port 64.

The memory 62 stores a management program 621 and network configuration information 622. The management program 621 is a program that performs management of the network apparatus 6. The network configuration information 622 is information for managing configuration, etc. of the communication network 5. The CPU 61 executes the management program 621 stored in the memory 62.

Figure 6:
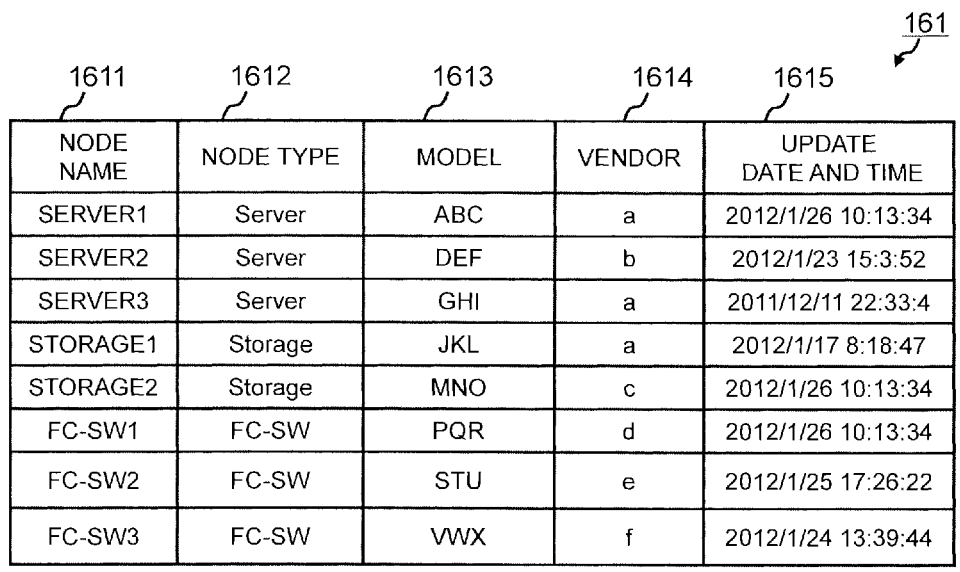
[FIG. 6]

FIG. 6 is a schematic diagram showing one example of the node information according to an embodiment.

The node information 161 is data for managing information regarding the node apparatus. The node information 161, for example comprises a table for managing a record regarding each node apparatus, and each record includes a field of the node name 1611, node type 1612, model 1613, vendor 1614, and update data and time 1615. The node name 1611 stores the name of the node apparatus. The node type 1612 stores data indicating the kind of the node apparatus. For example, in the node type 1612, "Server" is stored in the case where the node apparatus is the server apparatus 3, "Storage" is stored where the node apparatus is the storage apparatus 4, and "FC-SW" is stored in the case where the node apparatus is FC switch. The model 1613 stores the model name of the node apparatus. In the vendor 1614, the vendor name of the node apparatus is stored. In the update date and time 1615, a date and time on which the record regarding the node apparatus is updated is stored. For example, it is understood from the first record of the drawing, that the computer system comprises a node apparatus "SERVER 1" whose kind is server apparatus 3, and regarding the node apparatus "SERVER 1", the model thereof is "ABC", vendor is "a" and the record is updated on "2012/1/26 10:13:34".

FIG. 7A is a schematic diagram of a first example of the component information according to an embodiment. FIG. 7B is a schematic diagram of a second example of component information according to an embodiment. FIG. 7C is a schematic diagram of a third example of component information according to an embodiment.

The component information 162 is data for managing information regarding a component. FIG. 7A shows one example of component information 162 regarding the HDD. FIG. 7B shows one example of component information 162 regarding the CPU. FIG. 7C shows one example of component information 162 regarding power source. Any of component information 162 comprises for example a table for managing a record regarding a component. Each record includes fields of a component name 1621, a component type 1622, a node name 1623 and a status 1625 and update date and time 1626 as common field. The component name 1621 stores the name of the component. In the component type 1622, data indicating the kind of the component is stored. For example, in the component type 1622, "DISK" (where it is a SCSI (small computer system interface) disk, "SCSIDISK") is stored where the component is HDD, "CPU" is stored where the component is CPU, and "POWERSUPPLY" is stored where the component is the power source. In the node name 1623, the name of the node apparatus having the component is stored. In the status 1625, data indicating the status of the component is stored. For example, in the status 1625, "NORMAL" is stored where the status of the component is normal and "ERROR" is stored where the status of the component is abnormal. In the update date and time 1626, the date and time on which a record regarding component is updated is stored.

As shown in FIG. 7A, component information 162 regarding HDD includes a field of the disk capacity 1624 in addition to the above-described common fields. In the disk capacity 1624, a value indicating the capacity of the HDD that is the component is stored. As shown in FIG. 7B, component information 162 regarding CPU further includes the field of the clock frequency 1627 in addition to the above-described common field. In the clock frequency 1627, a clock frequency of the CPU that is the component is stored.

For example, it is understood from the 1st record from above of FIG. 7A that the node apparatus "SERVER 1" has a component "DISK1" of the HDD, and in the component "DISK1", the disk capacity is "500 GB" (GB means gigabyte), the status is normal and the record is updated on "2012/1/26 10:13:34". Further, from the 1st record from above in FIG. 7B, it is understood that the node apparatus "SERVER1" comprises a component "CPU 1" that is a CPU, and in the component "CPU1", the clock frequency is "2.5 GHZ" (GHZ means gigahertz), the status is normal and the record is updated on "2012/1/26 10:13:34". Further, it is understood from 1st record from above in FIG. 7C that the node apparatus "FC-SW1" has a component "POWERSUPPLY1" that is the power source, and in the component "POWERSUPPLY1", the status is normal, and the record is updated on "2012/1/26 10:13:34".

FIG. 8 is a schematic diagram of topology information according to an embodiment.

Topology information 171 is data for managing topology of the computer system, that is, a connection relationship between node apparatuses. The topology information 171 comprises, for example, a table, and includes the fields of topology ID 1711, node name 1712, and associated node name 1713. In the topology ID 1711, an identifier provided for a connection relationship between two node apparatuses (hereafter referred to as "node connection relationship") is stored. In the node name 1712 the name of the node apparatus is stored. In the associated node name 1713, a name of another node apparatus having a connection relationship with the node apparatus indicated by the node name 1712 is stored. It is understood, for example, from the first record from the above in the figure, that the node apparatus "SERVER1" and the node apparatus "FC-SW1" have the connection relationship.

FIG. 9 is a schematic diagram showing one example of event definition information according to an embodiment.

The event definition information 172 is data defining an event that may occur in the computer system. The event definition information 172 comprises, for example, a table, and includes fields of an event ID 1721, a node type 1722, a component type 1723, an event type 1724, and event content 1725. In the event ID 1721, an identifier (event ID) provided to the event is stored. In the node type 1722, data indicating the kind of the node apparatus related to the event is stored. In the component type 1723, data indicating the kind of the component related to the event is stored. In the event type 1724, data indicating the kind of an event is stored. For example, in the event type 1724, where the event is an event regarding the server apparatus 3, "server event" is stored and where the event is an event regarding the storage apparatus 4, "storage event" is stored and where the event is an event regarding the FC switch, "switch event" is stored. In the event content 1725, data indicating the content of the event is stored. It is understood, for example, from the first record from the above of the drawing, that the event in which the causal node type event ID is "0001" is, an event, "disk unmount", regarding the HDD in the server apparatus 3.

FIG. 10 is a schematic diagram showing one example of the meta rule information according to an embodiment.

The meta rule information 173 is data for managing one or more meta rules. Here, a meta rule refers to a rule that describes correspondence relationship between one or more events that may occur in the computer system (conditional event) and an event that is the cause of the case where the one or more conditional events occur (causal event) in a form that is independent from the actual configuration of the computer system. The meta rule information 173 comprises, for example, a table, and includes fields of a meta rule ID 1731, an event ID (server) 1732, an event ID (switch) 1733, an event ID (storage) 1734, a causal node type 1735, and causal event ID 1736. In the meta rule ID 1731, an identifier (meta rule ID) provided for a meta rule is stored. In the event ID (server) 1732, an identifier of a conditional event regarding the server apparatus 3 (conditional event ID) is stored. In the event ID (switch) 1733, an identifier of a conditional event regarding the FC switch (conditional event ID) is stored. In the event ID (storage) 1734, an identifier of a conditional event regarding the storage apparatus 4 (conditional event ID) is stored. Further, in an event ID (server) 1732, an event ID (switch) 1733, or an event ID (storage) 1734, in the case where there is no conditional event regarding node apparatus corresponding to each field, "−" is stored. In the causal node type 1735, data indicating the kind of the node apparatus related to the causal event is stored. In the causal event ID 1736, an identifier of the causal event (causal event ID) is stored.

For example, a meta rule whose meta rule ID is "0001" shows correspondence relationship between the event whose conditional event ID is "0005" and an event whose conditional event ID is "0021", and a causal event whose causal event ID is "0024". That is, the meta rule "0001" show that event "0024" is determined as the cause where the event "0005" and event "0021" occur. Here, as understood from the event definition information 172 of FIG. 9, the event "0005" is an event "disk I/O error" regarding server apparatus 3, the event "0021" is an event "link down" regarding the FC switch, and an event "0024" is an event "UNREACHABLE" regarding FC switch. Therefore, the meta rule "0001", shows that an event "UNREACHABLE" regarding FC switch is determined as the cause where the event "disk I/O error" regarding the server apparatus 3 and the event "link down" regarding the FC switch occur.

FIG. 11 is a schematic diagram showing one example of the expansion rule information according to an embodiment.

The expansion rule information 174 is data for managing one or more expansion rules. Here, the expansion rule refers to, a rule in which the meta rule is expanded to the form dependent on an actual configuration of the computer system, and that describes correspondence relationship between one or more events (conditional event) that may occur in a specific node apparatus that is an actual configuration of the computer system and an event that becomes the cause thereof where the one or more conditional events occur (causal event). The expansion rule information 174 comprises, for example, a table, and includes fields of expansion rule ID 1741, meta rule ID 1742, topology ID 1743, causal node name 1744, and causal event ID 1745. In the expansion rule ID 1741, an identifier provided for an expansion rule (expansion rule ID) is stored. In the meta rule ID 1742, an identifier of a meta rule that is to be the base of the expansion rule (meta rule ID) is stored. In the topology ID 1743, an identifier of a node connection relationship (topology ID) showing connection relationship between specific node apparatuses related to an event (conditional event or causal event) of an expansion rule. In the causal node name 1744, the name of a node apparatus related to a causal event is stored. In the causal event ID 1745, an identifier of a causal event (causal event ID) is stored.

A conditional event of an expansion rule is identified based on a meta rule to be a base (that is, a meta rule indicated by meta rule ID of meta rule ID 1742) and a node connection relationship indicating a specific connection relationship between node apparatuses related to an event of an expansion rule (that is, a node connection relationship indicated by a topology ID of topology ID 1743). For example, in an expansion rule whose expansion rule ID is "0001", a meta rule of meta rule ID "0001" is a base, and three node connection relationship are included (node connection relationship in which the topology ID is "0005", a node connection relationship in which the topology ID is "0006", and node connection relationship in which the topology ID is "0007") as node connection relationship indicating a connection relationship between specific node apparatuses related to an event of the expansion rule. Here, as understood from the meta rule information 173 of FIG. 10, a conditional event of meta rule "0001" is an event of "disk I/O error" regarding the server apparatus 3, and an event "link down" regarding the FC switch. Further, as is understood from the topology information 171 in FIG. 8, the node connection relationship "0005" shows the connection relationship between the node apparatus that is FC switch "FC-SW1" and the node apparatus "SERVER1" that is server apparatus 3, and the node connection relationship "0006" indicates the connection relationship between the node apparatus "FC-SW1" that is FC switch and the node apparatus "SERVER2" that is the server apparatus 3, and the node connection relationship "0007" indicates connection relationship between the node apparatus "FC-SW1" that is the FC switch and the node apparatus "STORAGE1" that is the storage apparatus 4. That is, the node connection relationship "0005", the node connection relationship "0006" and the node connection relationship "0007" indicate a topology in which the server apparatus "SERVER1", the server apparatus "SERVER2" and the storage apparatus "STORAGE1" are connected via the FC switch "FC-SW1". The conditional event of the expansion rule "0001" is that in which the origin (kind of node apparatus) of the conditional event of a meta rule "0001" is a specific node apparatus of a corresponding kind included in the topology indicated by the node connection relationship "0005", node connection relationship "0006", and the node connection relationship "0007". That is, the conditional event of the expansion rule "0001" is an event "disk I/O error" regarding the server apparatus "SERVER 1", an event "disk I/O error" regarding the server apparatus "SERVER2", and an event "link down" regarding the FC switch "FC-SW1".

For example, the expansion rule "0001" indicates "UNREACHABLE" event regarding the FC switch "FC-SW1" is determined as the cause where the event "disk I/O error" regarding the server apparatus "SERVER1", an event "disk I/O error" regarding the server apparatus "SERVER2", and an event "link down" regarding the FC switch "FC-SW1" occur.

FIG. 12 is a schematic diagram showing one example of receiving event information according to an embodiment.

Receiving event information 175 is data for managing event having occurred in the computer system and for which the management apparatus 1 has received an event message indicating the occurrence of the event (hereafter referred to as "receiving event"). The receiving event information 175 comprises, for example, a table, and includes fields of a receiving event ID 1751, a node name 1752, a component name 1753, an event ID 1754, and an event reception date and time 1755. In the receiving event ID 1751, identifier provided for the event (receiving event ID) is stored. In the node name 1752, the name of the node apparatus related to the receiving event is stored. In the component name 1753, the name of the component related to the receiving event is stored. In the event ID 1754, an identifier of an event (event ID) corresponding to the receiving event of the events defined by the event definition information 172 is stored. In the event reception date and time 1755, the date and time on which the management device 1 has received the receiving event is stored. For example, from the first record of the drawing, it is understood that the management device 1 has received an event message indicating the occurrence of an event (that is, the event "disk unmount") corresponding to event "0001" regarding HDD "DISK1", of the server apparatus "server 1" on "2012/1/26 10:13:34".

Figure 13A:
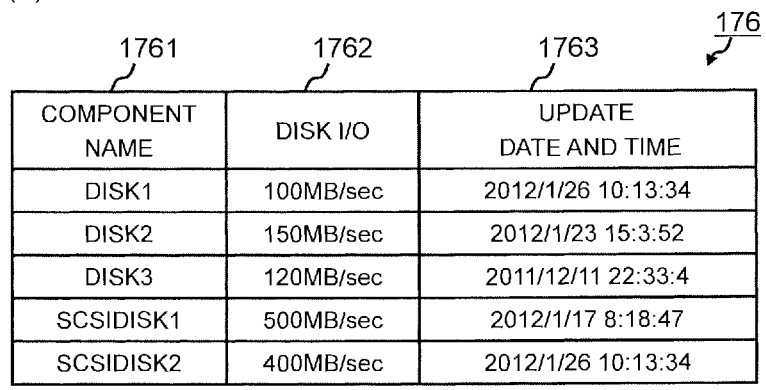
[FIG. 13A]
Figure 13B:
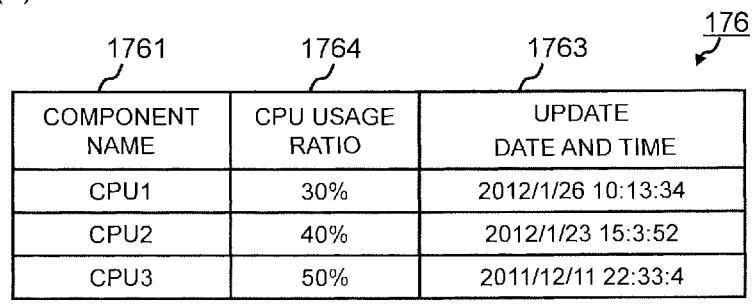
[FIG. 13B]

FIG. 13A is a schematic diagram showing a first example of performance information according to an embodiment. FIG. 13B is a schematic diagram of a second example of performance information according to an embodiment.

The performance information 176 is data for managing information regarding performance of a component. FIG. 13A shows one example of performance information 176 regarding HDD. FIG. 13B shows one example of performance information 176 regarding CPU. As shown in FIG. 13A, the performance information 176 regarding HDD comprises, for example, a table managing a record regarding HDD, and each record includes fields of a component name 1761, disk I/O 1762, and update data and time 1763. In the component name 1761, the name of the HDD which is a component is stored. In the disk I/O 1762, a performance value of the I/O (disk I/O) of the HDD that is the component is stored. In the update date and time 1763, a date and time on which a record regarding performance of a component (HDD) is updated is stored. Further, as shown in FIG. 13B, performance information 176 regarding CPU comprises, for example, a table for managing a record regarding CPU, and includes fields of a component name 1761, a CPU usage ratio 1764, and update date and time 1763. In the component name 1761, the name of CPU that is a component is stored. In the CPU usage ratio 17647, a value that indicates usage ratio of a CPU that is the component is stored. In the update date and time 1763, a date and time on which the record regarding the performance of the component (here, CPU) is updated is stored.

FIG. 14 is a schematic diagram showing one example of maintenance work definition table according to an embodiment.

The maintenance work definition table 177 is data indicating the correspondence relationship between a maintenance work performed by a system administrator and an event related to the maintenance work. Here, the event related to the maintenance work refers to an event regarding a node apparatus that is to be the target of the maintenance work and being estimated to occur when the maintenance work is performed. The maintenance work definition table 177 includes fields of node type 1771, vendor 1772, model 1773, component type 1774, maintenance work 1775, event ID 1776, and associated event ID 1777. In the node type 1771, data indicating the kind of node apparatus that is the target of the maintenance work is stored. In the vendor 1772, vendor name of the node apparatus that is the target of maintenance work is stored. In model 1773, the model name of the node apparatus that is the target of the maintenance work is stored. In the component type 1774, data indicating the kind of the component that is to be the target of the maintenance work is stored. In the maintenance work 1775, the name of the maintenance work is stored.

In the event ID 1776 and associated event ID 1777, an identifier of an event related to the maintenance work is stored. In the event ID 1776, an identifier (event ID) of an event most relevant to the maintenance work of the events related to the maintenance work (hereafter referred to as "first related event") is stored. For example, a first related event related to the maintenance work "server stop" is, an event "server stop" whose event ID is "0003" as shown in second record from above in FIG. 14. In the associated event ID 1777, an identifier (event ID) of an event related to a maintenance work other than the first related event (hereafter referred to as "second related event") is stored. Where there are a plurality of second events, the event ID of each of the second events is stored in the associated event ID 1777. For example, a second event related to the maintenance work "server stop" is, the event "disk unmount" whose event ID is "0001", and an event of "power off" whose event ID is "0002" as shown in second record from above in FIG. 14. In the maintenance work "server stop", the reason why the event "disk unmount" and the event "power off" are determined as the second events is that it is estimated that the event "disk unmount" and the event "power off" regarding the server apparatus 3 occur because the operation of the "disk unmount" and the operation of "power off" of the server apparatus 3 are performed accompanied by the maintenance work "server stop".

There are some cases where the events related to the maintenance work are different depending on the vendor or model of a node apparatus that is the target of the maintenance work even when the maintenance work is the same. For example, as shown in the 8th record from below of the drawing, events related to the maintenance work "power source exchange" on a FC switch whose vendor is "d" and model is "PQR" are an event "0022" and an event "0021". On the other hand, there is no event related to the maintenance work "power source exchange" on a FC switch, whose vendor is "e" and whose model is "STU", as shown in 5th record from below of the drawing. This difference is due to, for example, difference in number of the power source systems of both FC switches. Here, it is assumed that FC switch whose vendor is "d" and model is "PQR", has 1 power source system, FC switch whose vendor is E and model is STU, has 2 power source system. That is, since the FC switch whose vendor is "d" and model is "PQR" has only one power source system, where maintenance work "power source exchange" is performed, it becomes not possible to operate the FC switch, and as a result, event "0022" and event "0021" are caused. On the other hand, since an FC switch whose vendor is "e" and model is "STU" has 2 power source systems, even if a maintenance work "power source exchange" is performed on the one of the two power source systems, it is possible to continuously operate the FC switch and the FC switch continues to operate normally, so that no event will be caused.

For example, it is understood from the second record from above in the drawing that the events related to the maintenance work "server stop" on server apparatus 3 whose vendor is "a" and model is "ABC" are event "0001", event "0002", and event "0003". That is, where maintenance work "server stop" is performed on the server apparatus 3 whose vendor is "a" and model is "ABC", it is estimated that event "0001", event "0002", and event "0003" will be estimated to be caused.

FIG. 15 is a schematic diagram showing one example of filtering information according to an embodiment.

The filtering information 178 is data used when selection of a node apparatus to be the target of a maintenance work (hereafter "working target node apparatus") is accepted from the system administrator in order to show maintenance works that can be performed on the selected working target node apparatus, to the system administrator. That is, the filtering information 178 comprises data regarding maintenance work targeted at the working target node apparatus selected by the system administrator, of data included in the maintenance work definition table 177. That is, the filtering information 178 comprises data in which data stored in the node type 1771, vendor 1772, and model 1773 in the maintenance work definition table 177 comprise data regarding the maintenance work matching data indicating the kind of the working target node apparatus selected by the system administrator and data corresponding to the vendor name and model name. The filtering information 178 comprises, for example a table and includes fields of maintenance work 1781, event ID 1782, and associated event ID 1783. In the maintenance work 1781, the name of the maintenance work is stored. In the event ID 1782, an identifier (event ID) of the first related event related to the maintenance work is stored. In the associated event ID 1783, an identifier (event ID) of the second related event related to the maintenance work is stored.

The drawing shows filtering information 178 generated where the system administrator selects the FC switch whose vendor is "d" and model is "PQR" as a working target node apparatus where the maintenance work definition table 177 is in the state as shown in FIG. 14. In the filtering information 178, the value of the maintenance work 1775 is stored in the maintenance work 1781, the value of the event ID 1776 is stored in the event ID 1782, and the value of the associated event ID 1777 is stored in the associated event ID 1783, of the record whose vendor 1772 is "d", the model 1773 is "PQR", and the node type 1771 is "FC-SW", of the data included in the maintenance work definition table 177.

Next, the operation of the management apparatus 1 will be described according to an embodiment.

Figure 16:
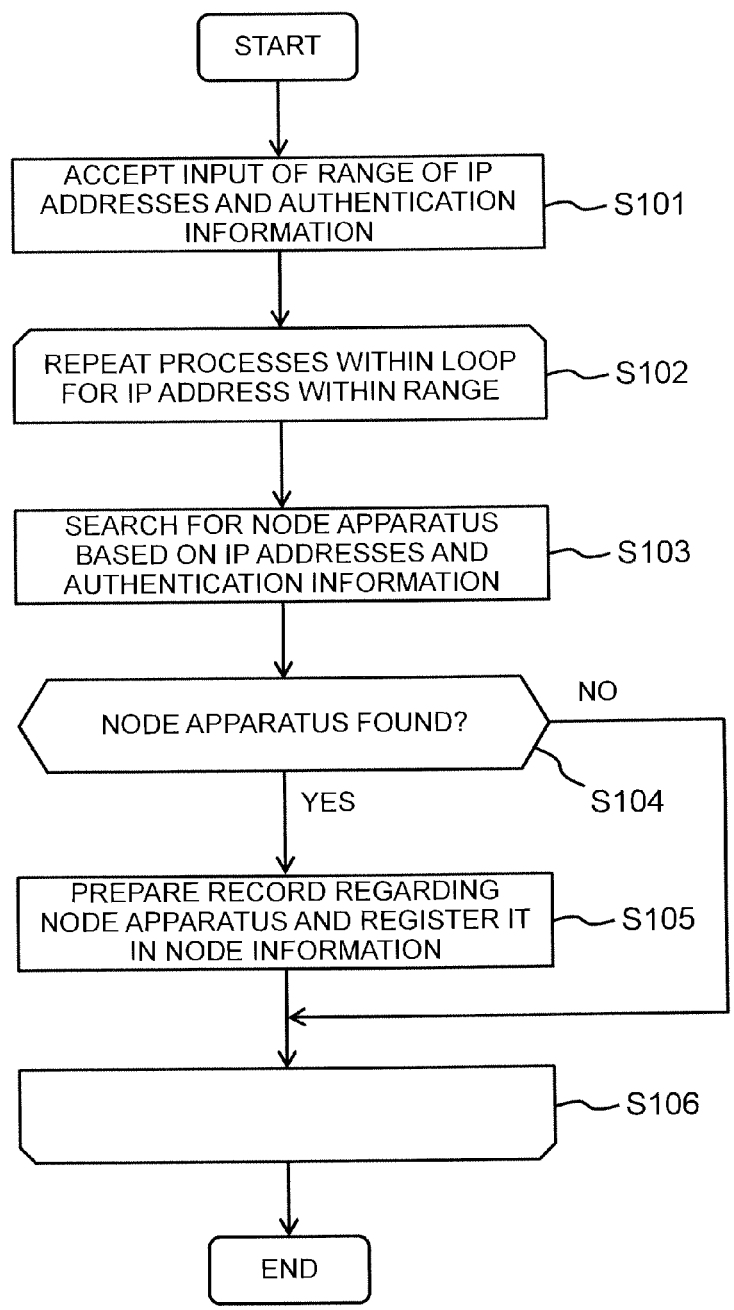
[FIG. 16]

FIG. 16 is a flowchart of an apparatus finding process according to an embodiment.

The apparatus finding process is a process of detecting a node apparatus existing in a computer system and registering the record regarding the detected node apparatus in the node information 161.

First, the management apparatus 1 accepts input of range of IP address and authentication information from the system administrator (step S101). Input of range of IP address and authentication information is performed via, for example, an input device, of a client terminal 2.

The apparatus finding part 152 of the management program 15 repeatedly performs processes of step S102 to step S106 on each IP address within the range of IP addresses whose input is accepted in step S101. The apparatus finding part 152 selects one of the IP addresses (hereafter "target IP addresses") within the range of IP addresses whose input is accepted in step S101.

The apparatus finding part 152 searches for a node apparatus having a target IP addresses based on target IP addresses and authentication information whose input is accepted in step S101 (step S103).

Next, the apparatus finding part 152 determines whether there exists a node apparatus having target IP addresses (step S104).

Where there exists a node apparatus having a target IP addresses (step S104: YES), the apparatus finding part 152 prepares a record of the node information 161 regarding a node apparatus having the target IP addresses and registers the prepared record to the node information 161 (step S105). The apparatus finding part 152 stores data indicating the name and kind of the node apparatus having the target IP addresses in the node name 1611 and node type 1612 of the record.

After performing step S105, or where there exists no node apparatus having the target IP addresses (step S104: NO), the apparatus finding part 152, when there is an IP address that has not yet been selected within the range of IP addresses whose input is accepted in step S101, selects one of the IP addresses not yet selected as a next target IP address and performs the processes of step S102 to step S106 on the selected target IP addresses.

The apparatus finding part 152, after completion of processes of step S102 to step S106 on each IP address within the range of IP addresses whose input is accepted in step S101, ends the apparatus finding process.

Figure 17:
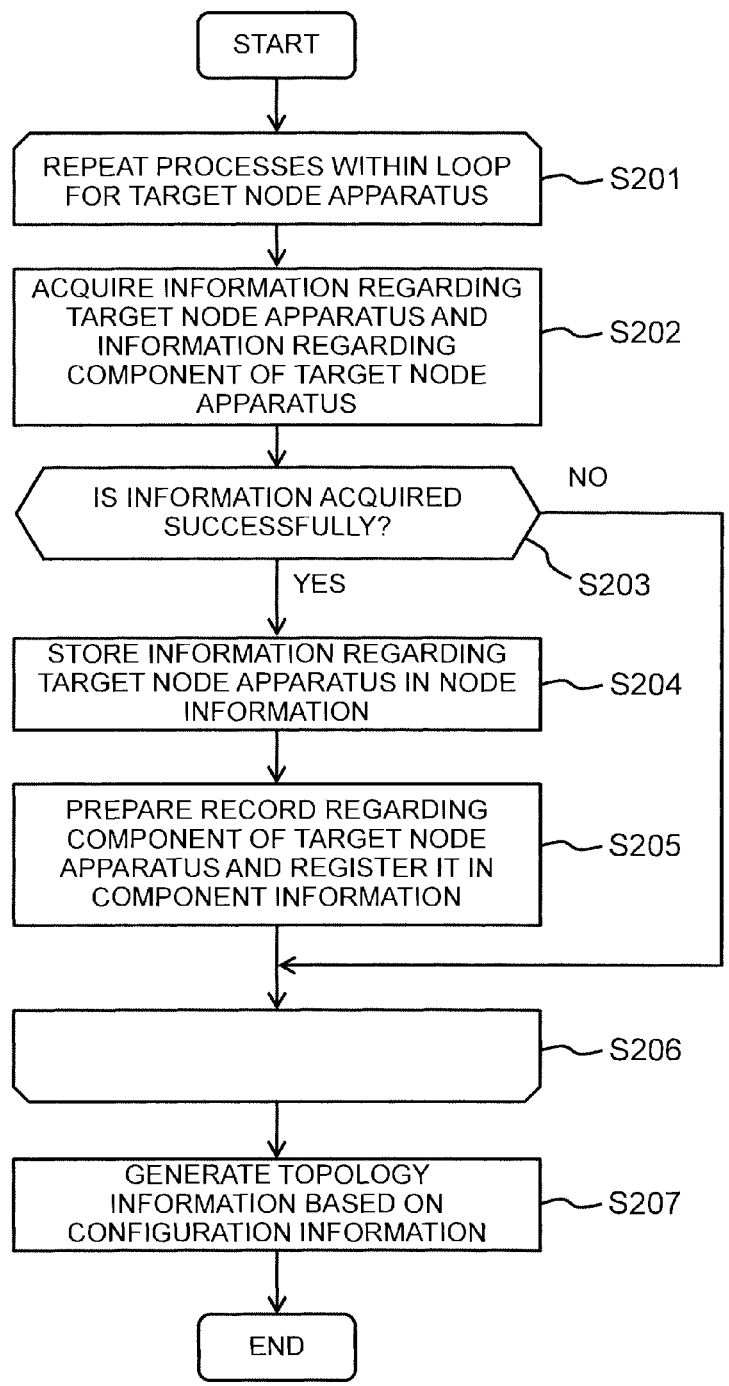
[FIG. 17]

FIG. 17 is a flowchart of configuration information acquisition process according to an embodiment.

The configuration information acquisition process is a process that acquires information regarding the node apparatus and information regarding the component of the node apparatus, and stores the acquired information in the node information 161 or component information 162. Further, topology information 171 is generated in the configuration information acquisition process.

The configuration information acquiring part 153 of the management program 15 repeatedly performs processes of step S201 to step S206 on each node apparatus registered in the node information 161. The configuration information acquiring part 153 selects one of the node apparatus registered in the node information 161 (hereafter referred to in the explanation of FIG. 17 as "target node apparatus").

The configuration information acquiring part 153 accesses to the target node apparatus by using the IP address and authentication information of the target node apparatus and acquires information regarding target node apparatus (specifically, model name and vendor name of target node apparatus), and acquires information regarding component of the target node apparatus (information managed in the component information 162) (step S202). In this process, the configuration information acquiring part 153, for example, acquires data indicating the node apparatus having connection relation with the target node apparatus (for example, the name of the node apparatus).

Next, the configuration information acquiring part 153 determines whether the acquisition of information regarding the target node apparatus, and information regarding the component of the target node apparatus is successful (step S203).

When the acquisition of information regarding the target node apparatus, and information regarding the component of the target node apparatus is successful (step S203: YES), the configuration information acquiring part 153 stores information regarding target node apparatus acquired in step S202 (model name and vendor name of target node apparatus) and the current date and time that is the update date and time in the record regarding target node apparatus in the node information 161 (step S204). Further, the configuration information acquiring part 153 adds data indicating node apparatus having connection relation with the target node apparatus to the configuration information 16.

Then, the configuration information acquiring part 153 prepares a record of component information 162 regarding the component of the target node apparatus and registers the prepared record in the component information 162 (step S205). The configuration information acquiring part 153 stores information regarding the component of the target node apparatus acquired in step S202 and the current date and time that is the update date and time in this record.

After execution of step S205, or where the acquisition of information regarding target node apparatus, and information regarding a component of the target node apparatus failed (step S203: NO), the configuration information acquiring part 153 selects from node apparatuses registered in the node information 161 a node apparatus not yet selected, as a target node apparatus, and performs the processes of step S201 to step S206 on the selected target node apparatus.

The configuration information acquiring part 153, after completion of processes of step S201 to step S206 on each node apparatus registered in the node information 161, identifies the connection relation between node apparatuses, and generates topology information 171 based on the configuration information 16 (step S207). After that, the configuration information acquiring part 153 terminates the configuration information acquisition process.

Figure 18:
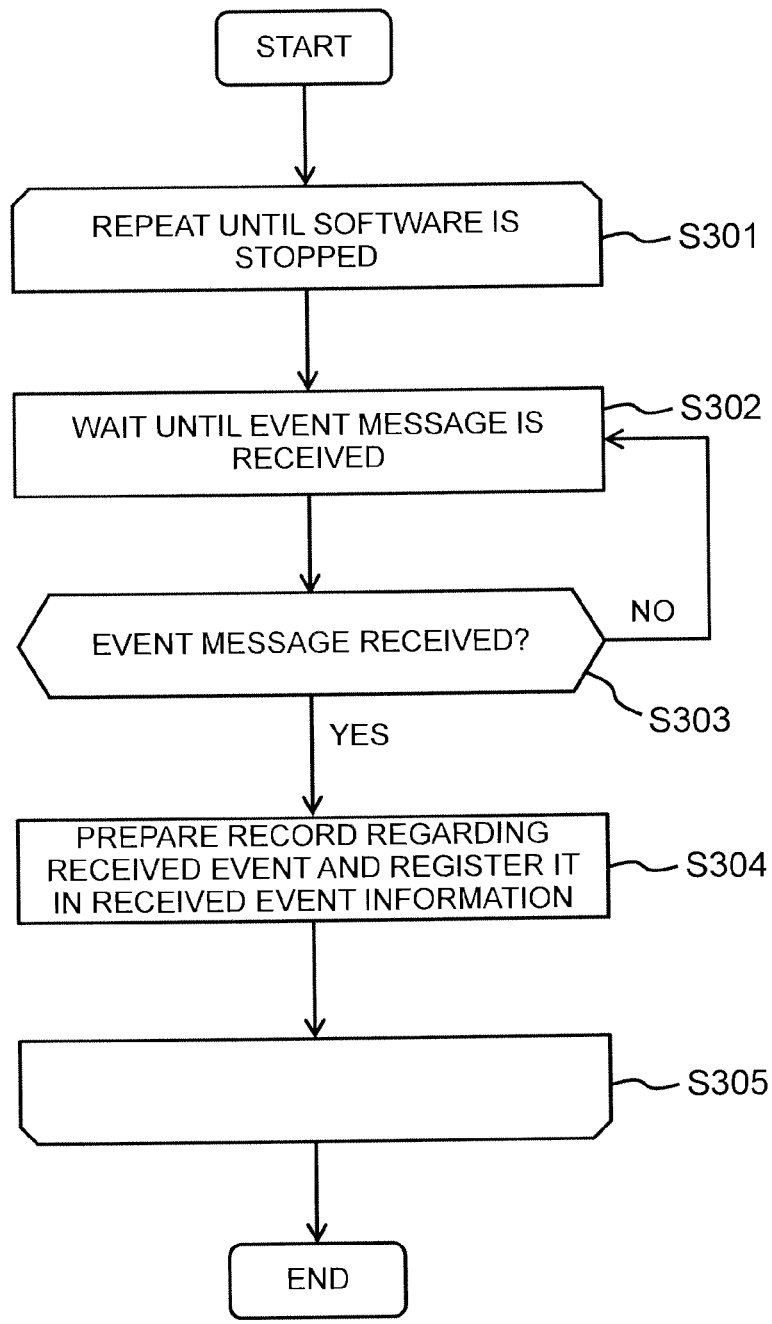
[FIG. 18]

FIG. 18 is a flowchart of an event reception process according to an embodiment.

The event reception process is a process of registering a record regarding the event indicated by the event message received (receiving event) in the receiving event information 175 when the management apparatus 1 receives an event message from the node apparatus.

The event receiving part 155 of the management program 15 repeatedly executes processes of step S301 to step S305 while the management program 15 is being executed.

The event receiving part 155 waits until the management apparatus 1 receives an event message from the node apparatus (step S302, step S303). The event receiving part 155 proceeds the process to step S304 when the management apparatus 1 receives an event message from the node apparatus (step S303: YES).

In step S304 the event receiving part 155 prepares a record of the receiving event information 175 regarding an event indicated by the event message received in step S302 and registers the prepared record in the receiving event information 175. After that, the event receiving part 155 proceeds the process to step S302 and waits until the management device 1 again receives an event message from the node apparatus.

Figure 19:
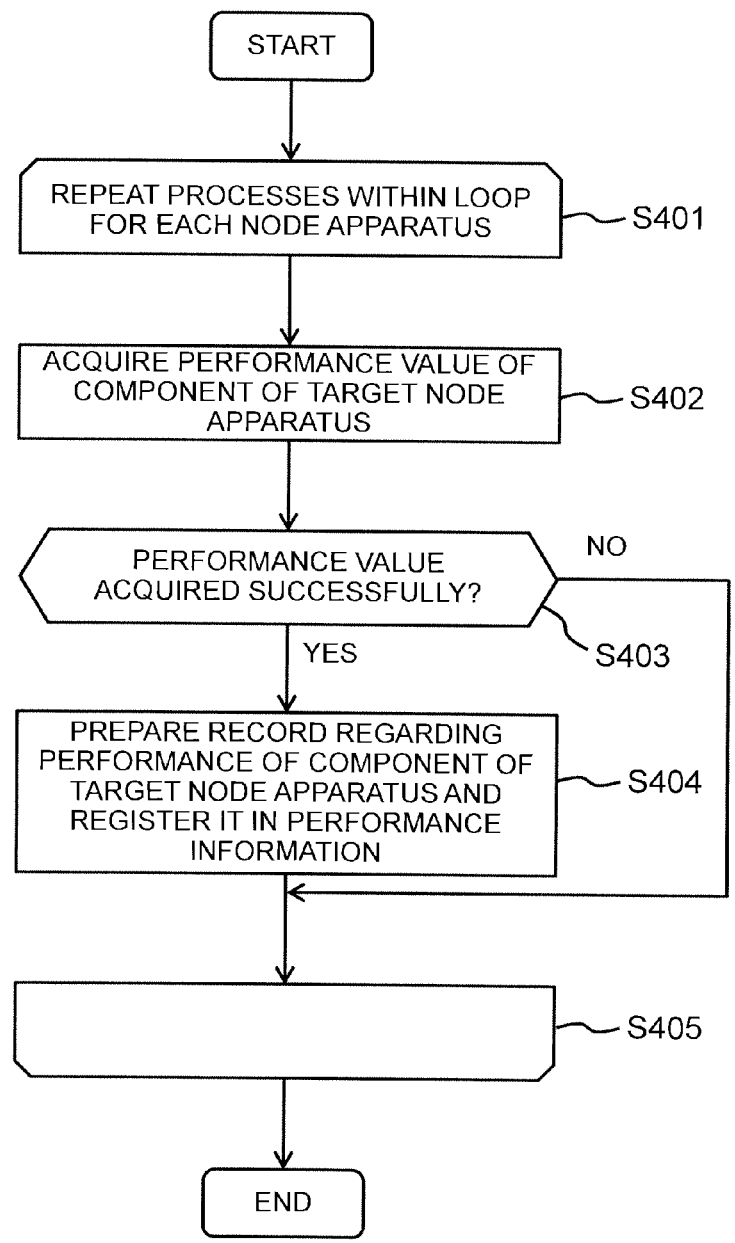
[FIG. 19]

FIG. 19 is a flowchart of performance information acquisition process according to an embodiment.

The performance information acquisition process is a process of acquiring the performance value of the component and storing the acquired performance value to the performance information 176.

The performance information acquiring part 154 of the management program 15 repeatedly performs the processes of step S401 to step S405 on each node apparatus registered in the node information 161. The performance information acquiring part 154 selects one of node apparatuses registered in the node information 161 (hereafter referred to as "target node apparatus" in explanation for FIG. 19).

The performance information acquiring part 154 accesses the target node apparatus by using the IP address and authentication information of the target node apparatus and acquires a performance value of the component of the target node apparatus (for example, when the component is a HDD, a performance value of the disk I/O, and when the component is a CPU, the value indicating the usage ratio of the CPU) (step S402).

Next, the performance information acquiring part 154 determines whether it is successful or not to acquire the performance value of the component of the target node apparatus (step S403).

Where the acquisition of the performance value of the component of the target node apparatus is successful (step S403: YES), the performance information acquiring part 154 prepares the record of the performance information 176 regarding the performance of the component of the target node apparatus, and registers the prepared record in the performance information 176 (step S404). The performance information acquiring part 154 stores the name of the component of the target node apparatus, a performance value acquired in step S402 and a current date and time that is the update data and time in the record.

After execution of step S404, or, where it is unsuccessful to acquire a performance value of the component of the target node apparatus (step S403: NO), the performance information acquiring part 154 selects a node apparatus not yet selected of the node apparatuses registered in the node information 161 as the target node apparatus and performs processes of step S401 to step S405 on the target node apparatus selected.

The performance information acquiring part 154, after completion of processes of step S401 to step S405 on each node apparatus registered in the node information 161, ends the performance information acquisition process.

Figure 20:
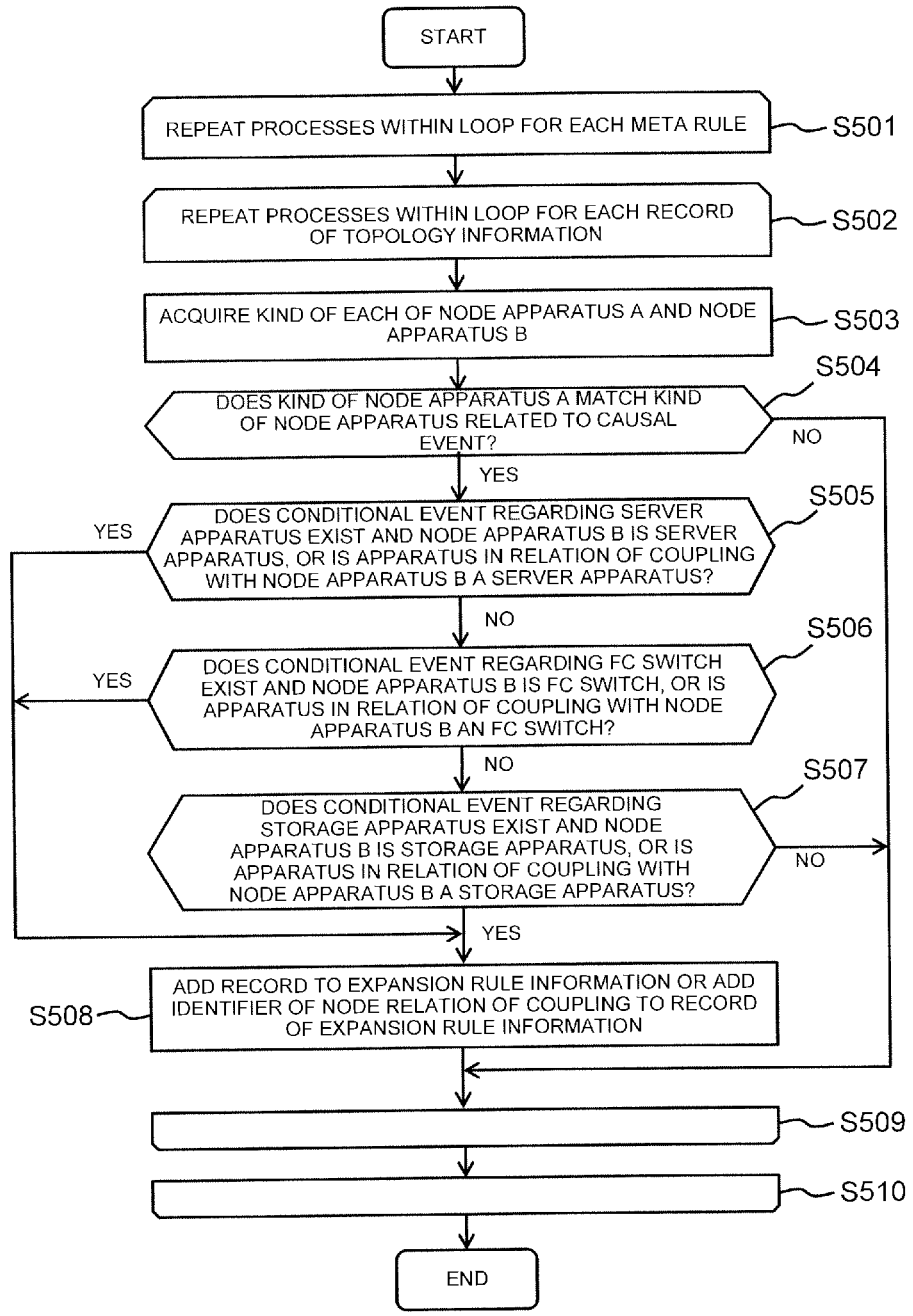
[FIG. 20]

FIG. 20 is a flowchart of rule expansion process according to an embodiment.

A rule expansion process is a process of generating an expansion rule based on the meta rule and the topology information 171.

The rule expansion part 158 of the management program 15 repeatedly performs processes of step S501 to step S510 on each meta rule registered in meta rule information 173. The rule expansion part 158 selects one of meta rules registered in the meta rule information 173 (hereafter referred to as "target meta rule").

The rule expansion part 158 repeatedly performs processes of step S502 to step S509 on each record registered in the topology information 171. The rule expansion part 158 selects one of the records registered in the topology information 171 (hereafter referred to as "target topology record").

The rule expansion part 158 acquires a kind (node type) of a node apparatus indicated by the node name 1712 in the target topology record (hereafter referred to as "node apparatus A") and a kind (node type) of the node apparatus indicated by the associated node name 1713 in the target topology record (hereafter referred to as "node apparatus B") from node information 161 (step S503).

Next, the rule expansion part 158 determines whether the kind of the node apparatus A matches kind of node apparatus related to a causal event of the target meta rule, that is, the kind indicated by the data stored in the causal node type 1735 of the record regarding the target meta rule in the meta rule information 173 (step S504).

Where the kind of the node apparatus A matches the kind of the node apparatus related to the causal event of target meta rule (step S504: YES), the rule expansion part 158 determines whether there exists a conditional event regarding a server apparatus 3 of the target meta rule, and the node apparatus B is the server apparatus 3 or the apparatus in relation of connection with node apparatus B is the server apparatus (step S505). For example, the rule expansion part 158 determines that there exists a conditional event regarding the server apparatus 3 of the target meta rule where any identifier of an event is stored in the event ID (server) 1732 of a record regarding a target meta rule in the meta rule information 173, and determines that there exists no conditional event regarding the server apparatus 3 of the target meta rule where "–" is stored in an event ID (server) 1732 of a record regarding a target meta rule in the meta rule information 173.

Where there exists no conditional event regarding the server apparatus 3 of the target meta rule, or where the node apparatus B is not the server apparatus 3 (step S505: NO), a rule expansion part 158 determines that there exists a conditional event regarding the FC switch of a target meta rule and whether the node apparatus B is an FC switch or an apparatus in relation of connection with node apparatus B is the FC switch (step S506). For example, the rule expansion part 158 determines that there exists a conditional event regarding an FC switch of the target meta rule where any event identifier is stored in the event ID (switch) 1733 of the record regarding the target meta rule of the meta rule information 173 and determines there exists no conditional event regarding FC switch where "–" is stored in the event ID (switch) 1733 of the record regarding a target meta rule in the meta rule information 173.

Where there exists no conditional event regarding the FC switch of the target meta rule, or the node apparatus B is not a FC switch (step S506: NO), the rule expansion part 158 determines whether there exists a conditional event regarding a storage apparatus 4 of the target meta rule and whether the node apparatus B is the storage apparatus 4, or the apparatus in relation of connection with node apparatus B is a storage apparatus (step S507). For example, where any event identifier is stored in the event ID (storage) 1734 of a record regarding target meta rule in meta rule information 173, the rule expansion part 158 determines that there exists a conditional event regarding a storage apparatus 4 in the target meta rule, and determines that there exists no conditional event regarding a storage apparatus 4 of the target meta rule where "–" is stored in the event ID (storage) 1734 of a record regarding the target meta rule in the meta rule information 173.

Where there exists a conditional event regarding a server apparatus 3 of the target meta rule, and the node apparatus B is the server apparatus 3, or the apparatus in relation of connection with node apparatus B is the server apparatus 3 (step S505: YES), or where the conditional event regarding the FC switch of the target meta rule exists and the node apparatus B is the FC switch, or the apparatus in relation of connection with the node apparatus B is the FC switch (step S506: YES), or where there exists a conditional event regarding a storage apparatus 4 of the target meta rule, and the node apparatus B is the storage apparatus 4, or the apparatus in relation of connection with node apparatus B is a storage apparatus (step S507: YES), the rule expansion part 158 prepares a record of the expansion rule information 174 and registers the prepared record in the expansion rule information 174 (step S508). The rule expansion part 158 stores the identifier of the target meta rule in the meta rule ID 1742 of this record, and stores the identifier of the node connection relationship indicated by the target topology record in the topology ID 1743, and stores the name of the node apparatus A in the causal node name 1744, and stores the identifier of the causal event of the target meta rule in the causal event ID 1745. Where a record in which the values of the meta rule ID 1742, the causal node name 1744, and the causal event ID 1745 match has already been registered in the expansion rule information 174, the rule expansion part 158 adds the identifier of the node connection relationship indicated by the target topology record in the topology ID 1743 of the record whose value matches. Further the rule expansion part 158 stores the identifier of the node connection relationship that indicates connection with the node apparatus B in the topology ID 1743 also where the apparatus in relation of the connection with node apparatus B matches the condition.

After execution of step S508, or where the kind of the node apparatus A does not match the kind of the node apparatus related to the causal event of the target meta rule (step S504: NO), or there exists no conditional event regarding the storage apparatus 4 of the target meta rule, or where the node apparatus B is not the storage apparatus 4 (step S507: NO), the rule expansion part 158 selects a record not yet selected of the record registered in the topology information 171 as a target topology record and performs the processes of step S502 to step S509 on the target topology record selected.

The rule expansion part 158, after completion of processes of step S501 to step S510, ends the rule expansion process on each meta rule registered in the meta rule information 173.

Figure 21:
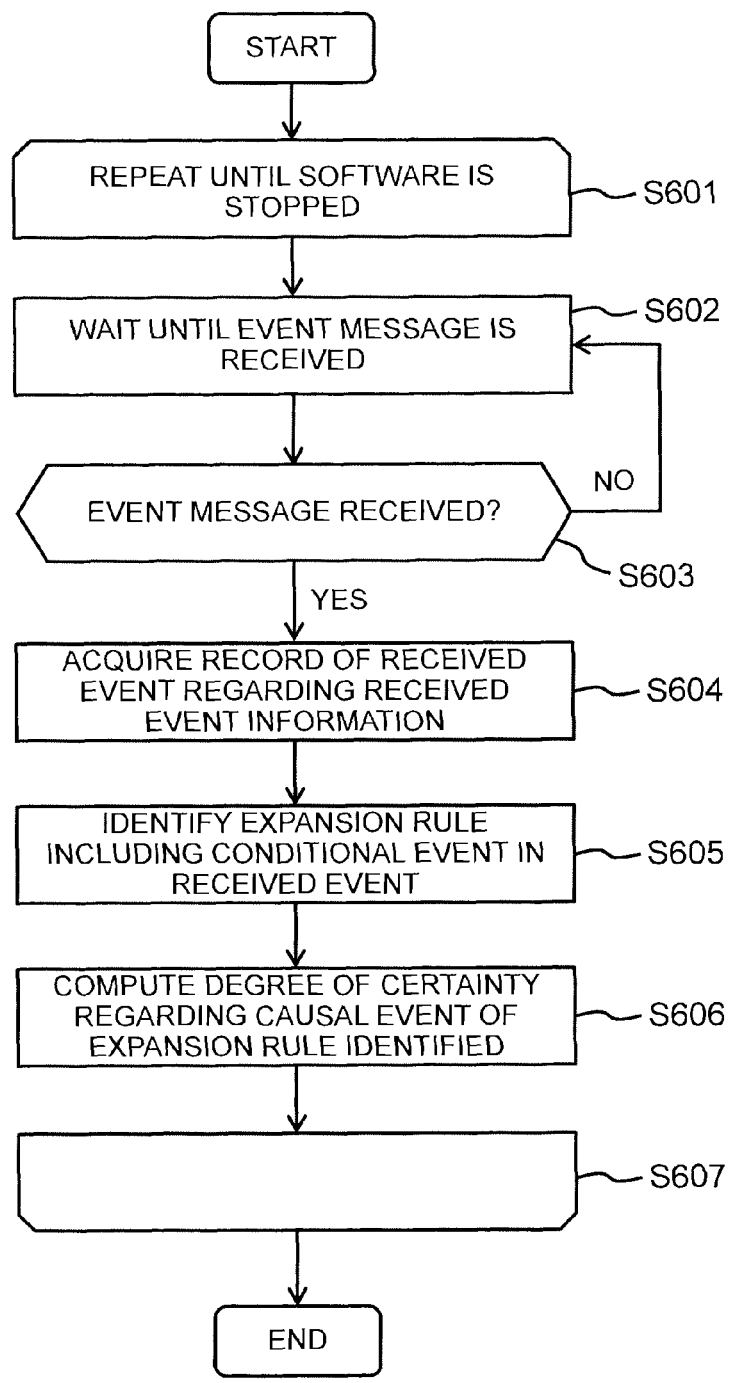
[FIG. 21]

FIG. 21 is a flowchart of root cause analyzing process according to an embodiment.

The root cause analyzing process is a process of analyzing the root cause of the event having occurred in the computer system.

The root cause analyzing part 159 of the management program 15 repeatedly executes processes of step S601 to step S607 while management program 15 is being executed.

The root cause analyzing part 159 waits until the management apparatus 1 receives an event message from the node apparatus (step S602, step S603). The root cause analyzing part 159 proceeds the process to step S604 when the management apparatus 1 receives an event message from the node apparatus (step S603: YES). When the management apparatus 1 receives an event message from the node apparatus, in the event reception process indicated in FIG. 18, a record regarding the event indicated by the event message received is registered in the receiving event information 175.

In step S604, the root cause analyzing part 159 acquires a record regarding an event indicated by the event message received in step S602 (hereafter referred to as "target receiving event") from the receiving event information 175. By referring to the acquired record, the root cause analyzing part 159 can know a node apparatus and a component related to a target receiving event and an event identifier corresponding to a target receiving event (event ID).

Next, the root cause analyzing part 159 refers to the expansion rule information 174, the meta rule information 173 and the topology information 171, and identifies an expansion rule including a target receiving event in the conditional event (step S605).

After that, the root cause analyzing part 159 computes a value indicating the degree of certainty regarding a causal event of an expansion rule identified, that is, the certainty that causal event is the root cause (step S606). The degree of certainty of the causal event is, for example, a ratio of incidence of one or more conditional events associated with the causal event. The root cause analyzing part 159 estimates the root cause, for example, based on the degree of certainty and notifies the result of the system administrator for example by displaying the result on an output device of the client terminal 2. After that, the root cause analyzing part 159 ends the root cause analyzing process.

The management apparatus 1 not only analyzes the root cause of the event having occurred in the computer system, but also may analyze the root cause of the deterioration in performance where there occurs deterioration in performance of the component in the computer system. Where the root cause of the deterioration in performance of the component is analyzed, the management apparatus 1 can determine whether deterioration in performance is occurring in each component for example, based on the performance value included in the performance information 176 of each component.

Figure 22:
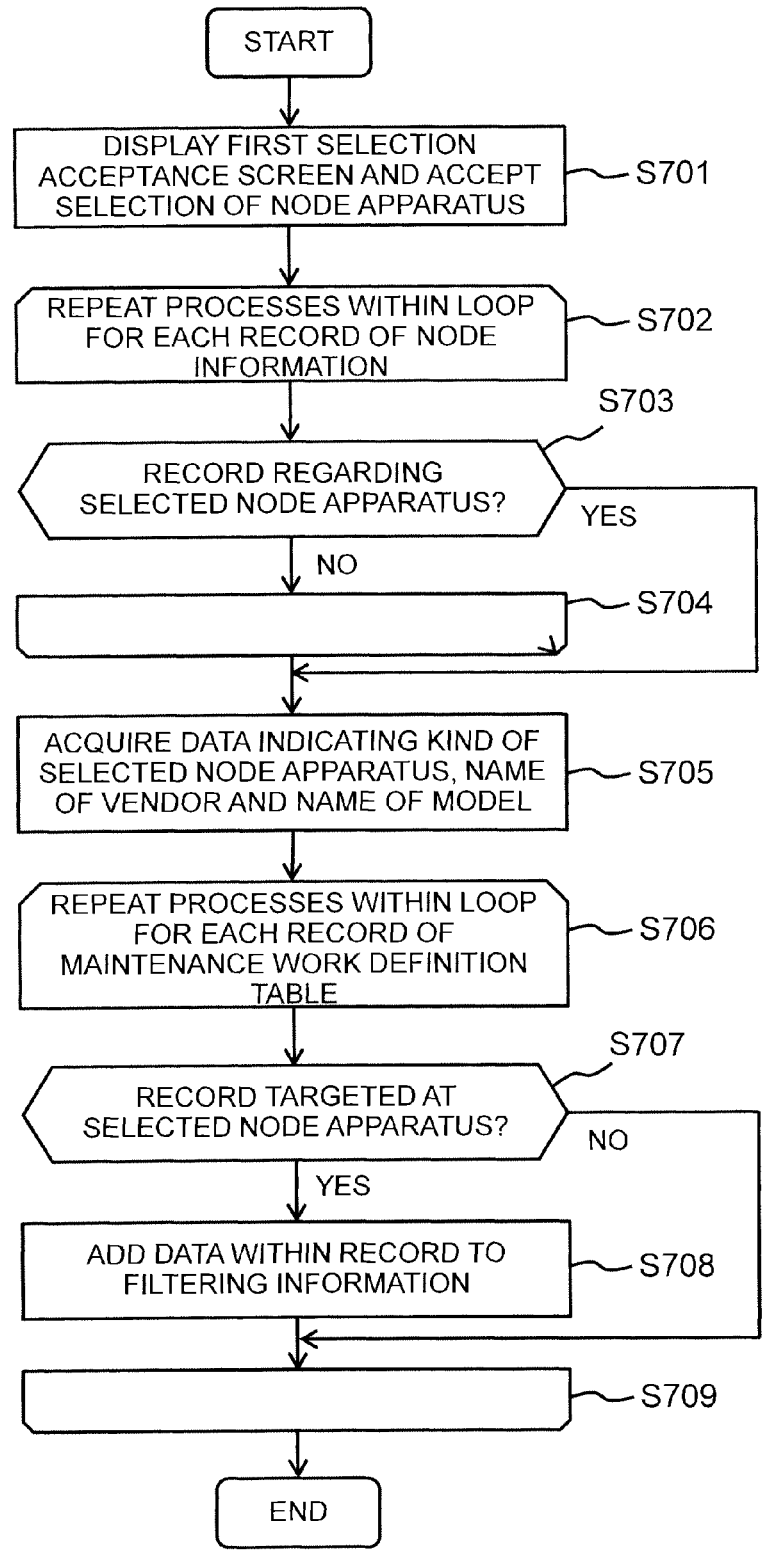
[FIG. 22]

FIG. 22 is a flowchart of filtering information generating process according to an embodiment.

The filtering information generating process is a process of accepting selection of a working target node apparatus (first node apparatus) from the system administrator and generating filtering information 178 including the name of maintenance work, etc. that can be performed on the working target node apparatus selected.

First, the input acceptance part 157 of the management program 15 causes the output device of the client terminal 2 to display a screen (hereafter "first selection acceptance screen") (see FIG. 26) for accepting selection of a working target node apparatus. Further, the input acceptance part 157 accepts the selection of the working target node apparatus from the system administrator via the first selection acceptance screen (step S701). That is, the input acceptance part 157 transmits data for generating a first selection acceptance screen (first screen data) to the client terminal 2. The client terminal 2 generates the first selection acceptance screen based on the first screen data received from the management apparatus 1 and displays the generated first selection acceptance screen on the output device. Further, the input acceptance part 157 receives selection of the working target node apparatus from the client terminal 2 on the first selection acceptance screen of the system administrator by the input device of the client terminal 2.

Next, the input acceptance part 157 repeatedly performs processes of step S702 to step S704 on each record registered in the node information 161. The input acceptance part 157 selects one of records registered in the node information 161 (hereafter referred to as "target node record").

The input acceptance part 157 determines whether the target node record is a record regarding the working target node apparatus whose selection is accepted in step S701 (step S703).

Where the target node record is not the record regarding the working target node apparatus (step S703: NO), the input acceptance part 157 selects a record not yet selected of the record registered in the node information 161 and performs processes of step 702 to step 704 on the selected record.

On the other hand, where the target node record is a record regarding working target node apparatus (step S703: YES), the input acceptance part 157 proceeds the process to step S705.

In step S705, the input acceptance part 157 acquires data indicating the kind of the working target node apparatus, the vendor name of the working target node apparatus, and the model name of the working target node apparatus from the target node record (step S705). For example, where the working target node apparatus is FC switch "FC-SW1", the "FC-SW" is acquired as data indicating the kind of the working target node apparatus, "d" is acquired as the vendor name of the working target node apparatus, and "PQR" is acquired as the model name of the working target node apparatus.

After that, the input acceptance part 157 repeatedly performs processes of step S706 to step S709 on each record registered in the maintenance work definition table 177. The input acceptance part 157 selects one of records registered in the maintenance work definition table 177 (hereafter "target maintenance work record").

The input acceptance part 157 determines whether the target maintenance work record is a record regarding the maintenance work targeted at the working target node apparatus (step S707).

Specifically, the input acceptance part 157 determines whether the data stored in the node type 1771, vendor 1772 and model 1773 of the target maintenance work record match data acquired in step S705 (data indicating the kind of the working target node apparatus, vendor name of the working target node apparatus, and model name of the working target node apparatus). The input acceptance part 157 determines that the target maintenance work record is the record regarding the maintenance work targeted at the working target node apparatus where both data match, and determines the target maintenance work record is not the record regarding the maintenance work targeted at the working target node apparatus where both data do not match.

For example, where the working target node apparatus is a FC switch "FC-SW 1", it is determined that, of the record shown in FIG. 11 and registered in the maintenance work definition table 177, 9th record from below (a record in which the node type 1771 is "FC-SW", the vendor 1772 is "d", the model 1773 is "PQR", and the maintenance work 1775 is "port exchange"); 8th record from below (the record in which the node type 1771 is "FC-SW", the vendor 1772 is "d", the model 1773 is "PQR", the maintenance work 1775 is "power source exchange"); and 7th record from below (the record in which the node type 1771 is "FC-SW", the vendor 1772 is "d", the model 1773 is "PQR", and the maintenance work 1775 is "FC-SW stop") are records regarding the maintenance work targeted at the working target node apparatus.

Where the target maintenance work record is the record regarding the maintenance work targeted at the working target node apparatus (step S707: YES), the input acceptance part 157 prepares the record of the filtering information 178 including data of the maintenance work 1775, the event ID 1776 and the associated event ID 1776 of the target maintenance work record, and registers the prepared record in the filtering information 178 (step S708). That is, the input acceptance part 157 registers a record including a name of the maintenance work that can be performed on the working target node apparatus and its identifiers of events related to the maintenance work (event ID) in the filtering information 178.

After step S708 is executed, or, where the target maintenance work record is not the record regarding the maintenance work targeted at the working target node apparatus (step S707: NO), the input acceptance part 157 selects records not yet selected of the records registered in the maintenance work definition table 177 as a next target maintenance work record and performs processes of step S706 to step S709 on the target maintenance work record selected.

The input acceptance part 157, after completion of the processes of step S706 to step S709 on each record registered in the maintenance work definition table 177, ends the filtering information generating process.

By the above-described processes being executed, filtering information 178 including the name of the maintenance work and the identifier of the event related to the maintenance work (event ID) are generated for each of the maintenance work that can be performed on working target node apparatus. For example, where working target node apparatus is a FC switch "FC-SW 1", filtering information 178 shown in FIG. 12 is generated.

Figure 23:
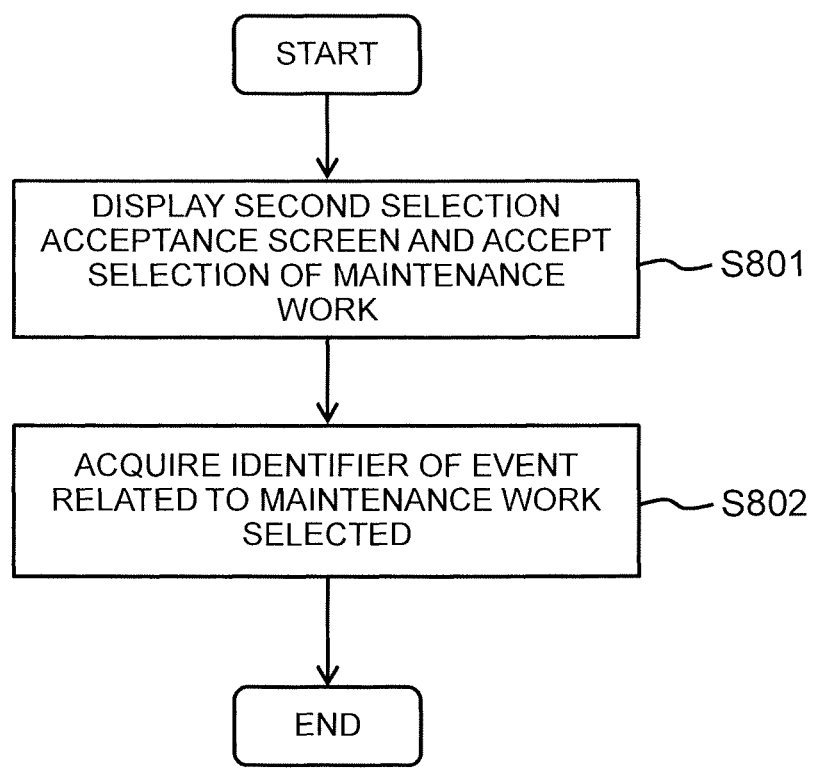
FIG. 23 is a flowchart of an event ID acquisition process according to an embodiment.

FIG. 23 shows a flowchart of an event ID acquisition process according to an embodiment.

The event ID acquisition process is a process of accepting the selection of maintenance work (first maintenance work) performed on the working target node apparatus (node apparatus whose selection is accepted in step S701 in FIG. 22) from the system administrator and acquiring the identifier (event ID) of the event related to the maintenance work selected (first event). The event ID acquisition process is performed, for example, after completion of the filtering information generating process in FIG. 22.

First, the input acceptance part 157 of the management program 15 causes the screen for accepting the selection of the maintenance work to be performed on the working target node apparatus (hereafter "second selection acceptance screen") (see FIG. 27) on the output device of the client terminal 2. On the second selection acceptance screen, the name of the maintenance work included in the filtering information 178 generated in the filtering information generating process in FIG. 22, that is, the names of maintenance works that can be performed on the working target node apparatus are displayed. Then, the input acceptance part 157 accepts the selection of the maintenance work to be performed on the working target node apparatus from the system administrator via the second selection acceptance screen (step S801). That is, the input acceptance part 157 transmits data for generating the second selection acceptance screen (second screen data) to the client terminal 2. The client terminal 2 generates the second selection acceptance screen based on the second screen data received from the management apparatus 1 and displays the generated second selection acceptance screen on the output device. The input acceptance part 157 receives from the client terminal 2 the selection of the maintenance work on the second selection acceptance screen of the system administrator using the input device of the client terminal 2.

After that, the input acceptance part 157, based on the filtering information 178 generated in the filtering information generating process in FIG. 22, acquires identifiers of events related to the maintenance work for which selection has been accepted in step S801 (hereafter "selected maintenance work"), that is, event ID stored for each of the event ID 1776 and the associated event ID 1776 of record regarding the selected maintenance work (step S802). After that, the input acceptance part 157 ends the event ID acquisition process.

Figure 24:
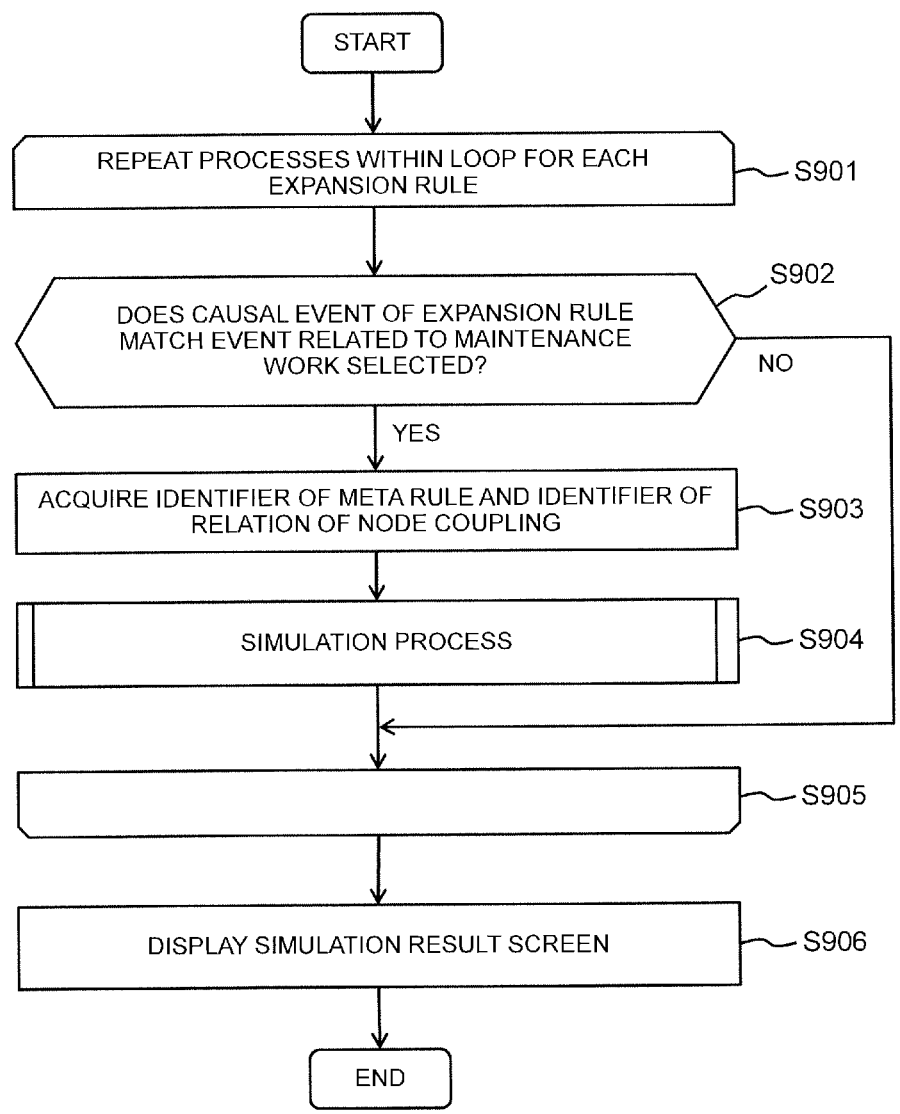
[FIG. 24]

FIG. 24 is a flowchart of range of effect identification process according to embodiment.

The range of effect identification process is a process of identifying the range of effect and phenomenon in the case where the selected maintenance works (maintenance work whose selection is accepted in step S801 in FIG. 23) is performed on the working target node apparatus (node apparatus for which selection is accepted in step S701 in FIG. 22). Here, the range of effect of the case where the maintenance work is performed is a range including one or more node apparatuses affected by the event related to the maintenance work, that is, one or more node apparatuses related to events to occur due to the effect of the event related to the maintenance work. Further, the phenomenon of the case where the maintenance work is performed refers to an event occurring due to the effect of the event related to the maintenance work. The range of effect identification process is performed for example after completion of the event ID acquisition process in FIG. 23.

The simulation part 156 of the management program 15 accepts inputs of the name of the working target node apparatus and identifier of the event acquired in step S802 in FIG. 23 and related to the selected maintenance work (first related event and one or more second related events) for example, on the start of the range of effect identification process.

The simulation part 156 repeatedly performs the processes of step S901 to step S905 on each expansion rule registered in the expansion rule information 174. The simulation part 156 selects one of the expansion rules registered in the expansion rule information 174 (hereafter referred to as "target expansion rule").

The simulation part 156 determines whether the causal event of the target expansion rule matches an event related to the selected maintenance work (step S902).

Specifically, the simulation part 156 determines whether the identifier of the causal event of the target expansion rule (causal event ID indicated by the causal event ID 1745) matches identifier (event ID) of an event related to the selected maintenance work (either of the first related event and one or more second related events), and, whether the node apparatus related to the causal event of the target expansion rule (node apparatus indicated by the causal node name 1744) matches the working target node apparatus. Where the identifier of the causal event of the target expansion rule matches the identifier of the event related to the selected maintenance work (matches an identifier of either of first related event and one or more second related event), and a node apparatus related to the causal event of the target expansion rule matches the working target node apparatus, the causal event of the target expansion rule is determined to match an event related to the selected maintenance work. On the other hand, where the identifier of the causal event of the target expansion rule does not match the identifier of the event related to the selected maintenance work (matches neither identifier of the first related event and one or more second related events), or where the node apparatus related to the causal event of the target expansion rule does not match the working target node apparatus, it is determined that the causal event of the target expansion rule does not match the event related to the selected maintenance work.

Where the causal event of the target expansion rule matches an event related to the selected maintenance work (step S902: YES), the simulation part 156, based on the expansion rule information 174, acquires the identifier of the meta rule that is to be the base of the target expansion rule, that is, the meta rule ID stored in the meta rule ID 1742 of the record regarding the target expansion rule and an identifier of the node connection relationship indicating the connection relation between specific node apparatuses related to the event of the target expansion rule (conditional event or causal event), that is, the topology ID stored in the topology ID 1743 of the record regarding the target expansion rule (step S903).

After that, the simulation part 156 performs a later-described simulation process (see FIG. 25) regarding target expansion rule (step S904). By the simulation process, data indicating the range of effects and phenomenon of the case where the selected maintenance work is performed on the working target node apparatus is stored in the memory 12 or the storage device 14.

After execution of step S904, or, a causal event of the target expansion rule does not match the event related to the selected maintenance work (step S902: NO), the simulation part 156 selects as next target expansion rule an expansion rule that is not yet selected of the expansion rules registered in the expansion rule information 174, and perform processes of step S901 to step S905 on target expansion rule selected.

Figure 28:
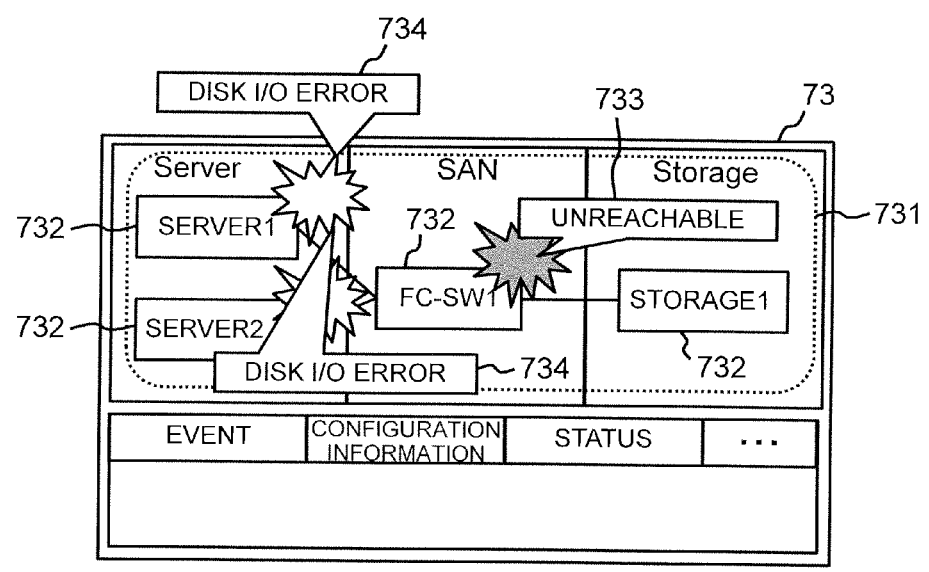
[FIG. 28]

The simulation part 156, after completion of processes of step S901 to step S905 on each expansion rule registered in expansion rule information 174, causes the output device of the client terminal 2 to display a simulation result screen for displaying the range of effect and phenomenon of the case where the selection maintenance work is performed on the working target node apparatus (see FIG. 28). That is, the simulation part 156 transmits data for generating a simulation result screen, that is, data including data indicating the range of the effect and the phenomenon of the case where the selected maintenance work is performed on the working target node apparatus stored in the memory 12 or storage device 14 (third screen data) and transmits the data to the client terminal 2 by the simulation process of step S904. The client terminal 2 generates a simulation result screen based on third screen data received from the management apparatus 1, and displays the generated simulation result screen to the output device. After that, the simulation part 156 ends the range of effect identification process.

Figure 25:
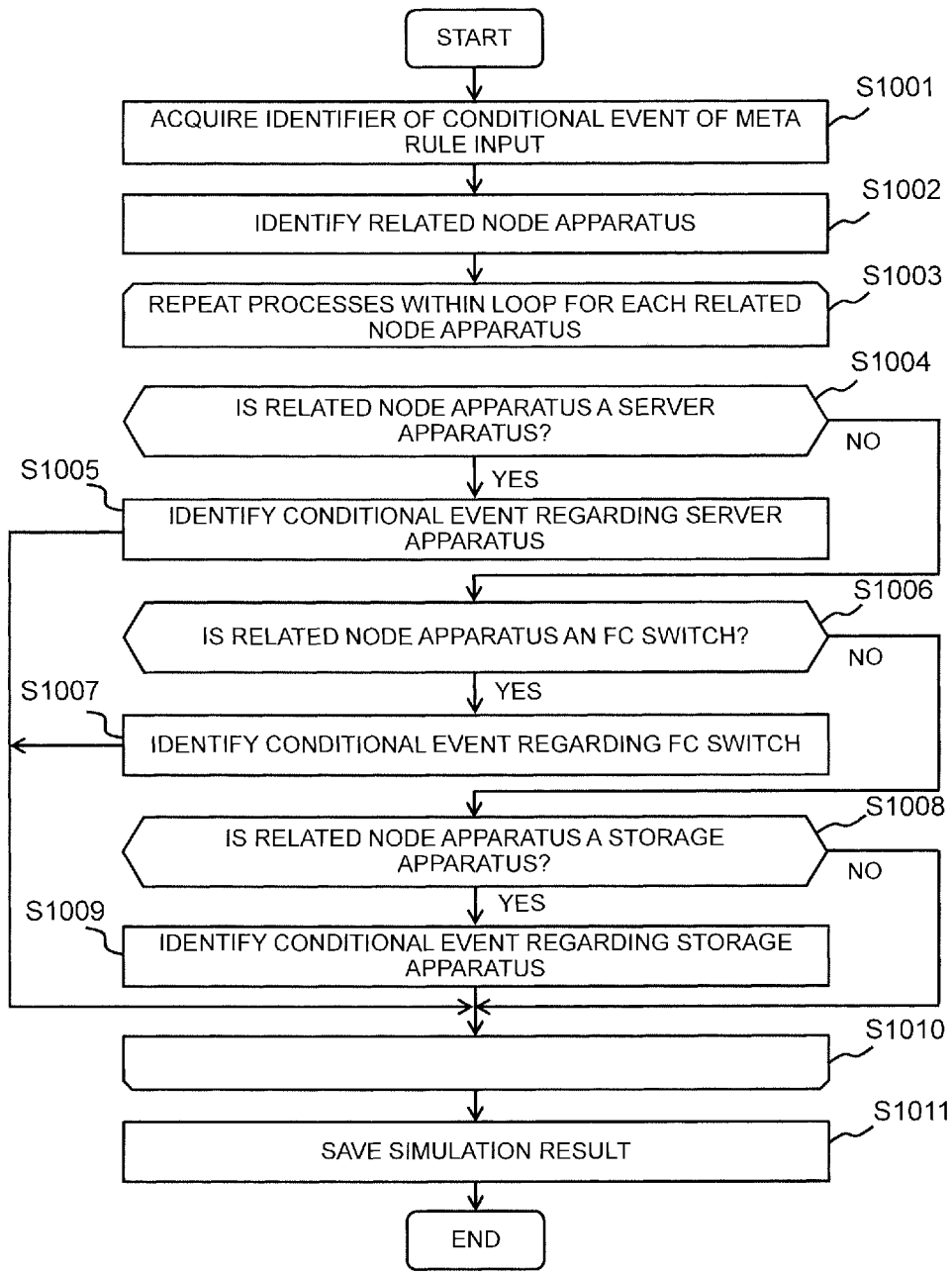
[FIG. 25]

FIG. 25 is a flowchart of simulation process according to an embodiment.

The simulation process is a process of identifying the one or more conditional events of expansion rules to be the target of simulation (expansion rule in which the causal event matches an event related to the selected maintenance work, hereafter referred to as "simulation expansion rule") and node apparatuses related to the one or more conditional events. The identified node apparatus and conditional event are determined as the range of effect and phenomenon of the case where the selected maintenance work is performed on the working target node apparatus.

The simulation part 156 of the management program 15 accepts inputs of the name of the working target node apparatus, and the identifier of the meta rule and identifiers of one or more node connection relationships acquired in step S903 of FIG. 24, for example, at the start of the simulation process.

First, the simulation part 156 acquires the identifier of the conditional event of the input meta rule (the meta rule to be the base of the simulation expansion rule, hereafter "simulation meta rule") (conditional event ID) from the meta rule information 173 (step S1001). Specifically, the simulation part 156 acquires conditional event ID stored in an event ID (server) 1732 of the record regarding simulation meta rule in the meta rule information 173 (identifier of the conditional event regarding the server apparatus 3) and conditional event ID stored in an event ID (switch) 1733 (identifier of the conditional event regarding the FC switch), conditional event ID stored in the event ID (storage) 1734 (identifier of the conditional event regarding the storage apparatus 4). For example, where the simulation meta rule is the meta rule "0001", the conditional event ID stored in the event ID (server) 1732 of the record regarding the meta rule "0001" in the meta rule information 173 of FIG. 11, that is, "0005" is acquired as identifier of the conditional event regarding server apparatus 3, and the conditional event ID stored in the event ID (switch) 1733 of a record regarding the meta rule "0001", that is, "0021" is acquired as an identifier of the conditional event regarding the FC switch.

Next the simulation part 156 identifies one or more node apparatuses (hereafter referred to as "related node apparatus") related to an event of the simulation expansion rule (conditional event or causal event) based on input one or more node connection relationships, that is, one or more node connection relationships indicating specific connection relation between node apparatuses related to an event of simulation expansion rule (conditional event or causal event) (step S1002). For example, where input one or more node connection relationship are the node connection relationship "0005" and the node connection relationship "0006", the server apparatus "SERVER1", the server apparatus "SERVER2", and the FC switch "FC-SW1" are identified as related node apparatuses.

The simulation part 156 repeatedly performs processes of step S1003 to step S1010 on each related node apparatus identified in step S1002. The simulation part 156 selects one of the related node apparatuses identified in step S1002 (hereafter referred to as "target related node apparatus").

The simulation part 156 determines whether the target related node apparatus is the server apparatus 3 or not (step S1004).

Where the target related node apparatus is the server apparatus 3 (step S1004: YES), the simulation part 156 identifies the conditional event regarding the server apparatus 3 of the simulation expansion rule by relating the target related node apparatus with a conditional event regarding the server apparatus 3 of the simulation meta rule (step S1005). For example, where in step S1001, "0005" is acquired as an identifier of the conditional event of the server apparatus 3 and the target related node apparatus is the server apparatus "SERVER 1", an event of event ID "0005" regarding the server apparatus "SERVER 1" (that is, event of the "disk I/O error") is identified as the conditional event regarding the server apparatus 3 of the simulation expansion rule. The conditional event identified in step S1005 is determined as a phenomenon of the case where the selected maintenance work is performed on the working target node apparatus, and the node apparatus related to the conditional event identified in step S1005 is determined as a node apparatus included in the range of effect of the case where the selection maintenance work is performed on working target node apparatus.

On the other hand, where the target related node apparatus is not the server apparatus 3 (step S1004: NO), the simulation part 156 determines whether the target related node apparatus is a FC switch (step S1006).

Where the target related node apparatus is a FC switch (step S1006: YES), the simulation part 156 identifies the conditional event of the simulation expansion rule regarding the FC switch by relating of the target related node apparatus to the conditional event regarding FC switch of the simulation meta rule (step S1007). For example, in step S1001, where "0021" is acquired as an identifier of the conditional event regarding a FC switch and the target related node apparatus is FC switch "FC-SW1", an event whose event ID is "0021" regarding the FC switch "FC-SW1" (that is, of an event "link down") is identified as a conditional event regarding the FC switch of the simulation expansion rule. The conditional event identified in step S1007 is determined as the phenomenon of the case where selected maintenance work is performed on the working target node apparatus, and the node apparatus related to the conditional event identified in step S1007 is a node apparatus included in the range of effect of the case where the selected maintenance work is performed on the working target node apparatus.

On the other hand, where the target related node apparatus is not FC switch (step S1006: NO), the simulation part 156 determines whether the target related node apparatus is a storage apparatus 4 (step S1008).

Where the target related node apparatus is a storage apparatus 4 (step S1008: YES), the simulation part 156 identifies the conditional event regarding the storage apparatus 4 of the simulation expansion rule by relating the target related node apparatus to the conditional event regarding the storage apparatus 4 of the simulation meta rule (step S1009). For example, in step S1001, where "0014" is acquired as an identifier of a conditional event regarding the storage apparatus 4 and the target related node apparatus is the storage device "STORAGE1", an event regarding storage apparatus "STORAGE1" whose event ID is "0014" (that is, the event UNREACHABLE") is identified as a conditional event regarding the storage apparatus 4 of the simulation expansion rule. The conditional event identified in step S1009 is determined as the phenomenon of the case where the selected maintenance work is performed on the working target node apparatus, and a node apparatus related to the conditional event identified in step S1009 is determined as a node apparatus included in the range of effect of the case where the selected maintenance work is performed on the working target node apparatus.

After execution of step S1005, step S1007 or step S1009, where the target related node apparatus is not the storage device 4 (step S1008: NO), the simulation part 156 selects a related node apparatus not yet selected of the related node apparatuses identified in step S1002 as the next target related node apparatus, and processes of step S1003 to step S1010 are performed on the selected target related node apparatus.

The simulation part 156, after completion of the processes of step S1003 to step S1010 on each related node apparatus identified in step S1002, stores in the memory 12 or storage device 14 the data indicating node apparatus related to the conditional event identified in step S1005, step S1007 and step S1009, that is, the data indicating the range of effect and the phenomenon of the case where the selected maintenance work is performed on the working target node apparatus (step S1011). After that, the simulation part 156 ends the simulation process.

In the above-described range of effect identification process shown in FIG. 24, the management device 1 uses the meta rule, the expansion rule, and the topology information 171 in order to identify the range of effect and phenomenon of the case where the selected maintenance work is performed on the working target node apparatus. The management apparatus 1 may use, for example, whole or part of the meta rule, the expansion rule and the topology information 171, the meta rule used in the cause analyzing process in FIG. 21 (including a part of the rule and the part of the information) in the range of effect identification process. That is, the management apparatus 1 may share the whole or part of the meta rule, the expansion rule or topology information in the storage device 14 or loaded from the storage device 14 to the memory 12 between the range of effect identification process and the cause analyzing process. By sharing the whole or part of the meta rule, the expansion rule, or topology information, it is possible to cut the usage capacity of the storage device 14 and the memory 12. Further, it becomes possible to expect the improvement of processing performance of the range of effect identification process and the cause analyzing process since the possibility that the shared rules, etc. are on cache increases.

On the other hand, in the rules used in the range of effect identification process (meta rule, expansion rule), a rule dedicated for simulation used in the range of effect identification process while not being used in the cause analyzing process may be included. By defining the dedicated rule for simulation, it becomes possible for the management apparatus 1 to perform identification of the range of effect and phenomenon by further using the rule including, for example, event that is actually not detectable (hereafter, referred to as undetectable event). For example, where the event regarding the stop of the apparatus, including the "server stop", "storage stop", "FC SWITCH STOP", etc., or an event such as pulling out the cable, it becomes not possible to transmit the event message, they are actually considered as an undetectable event (in which the management apparatus 1 does not receive the event message indicating the occurrence of event). By utilizing in the range of effect identification process the rules including such undetectable events as dedicated rule for simulation, it becomes possible to deal with the undetectable event included in the dedicated rule for simulation as the target of identification of the range of effect and phenomenon, and where the undetectable event corresponds to a phenomenon in the case where the selected maintenance work is performed on the working target node apparatus, it becomes possible to notify that of the system administrator.

Figure 26:
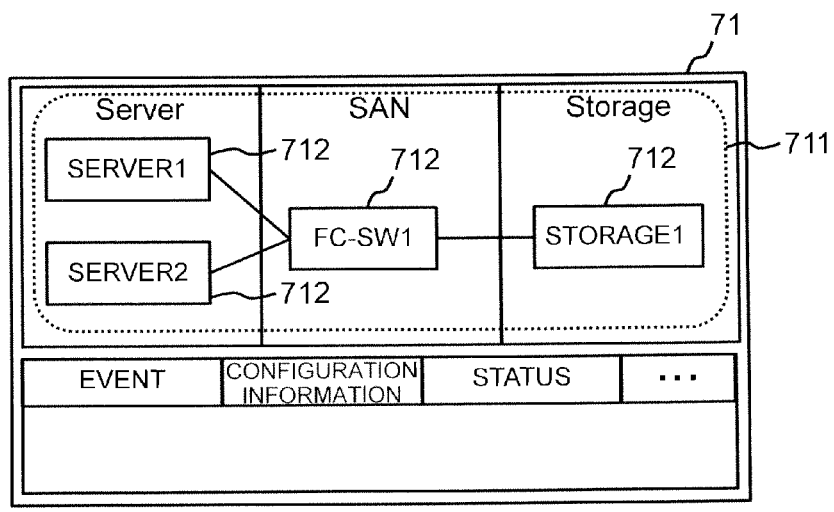
[FIG. 26]

FIG. 26 is a schematic diagram showing one example of a first selection acceptance screen according to an embodiment.

The first selection acceptance screen 71 is a screen for accepting the selection of the working target node apparatus from the system administrator. The first selection acceptance screen 71 includes region 711 for displaying node apparatuses constituting a computer system and the connection relation between the node apparatuses. Each graphic 712 in region 711 indicates the node apparatus and a solid line between two geometries 712 shows a node apparatus indicated by each of both geometries 712 has connection relationship with the other of them. Each graphic 712 is, for example, a button for selecting a node apparatus indicated by the graphic 712. The system administrator selects the working target node apparatus by, for example, pressing down the graphic 712 corresponding to the working target node apparatus. The client terminal 2 having accepted the selection of the working target node apparatus transmits the data indicating the selected working target node apparatus to the management apparatus 1.

Figure 27:
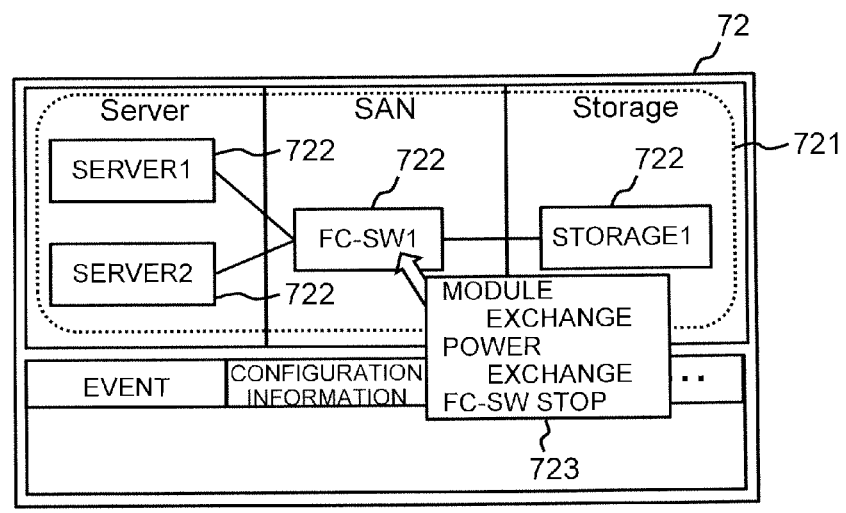
[FIG. 27]

FIG. 27 is a schematic diagram showing one example of a second selection acceptance screen according to an embodiment.

The second selection acceptance screen 72 is a screen for accepting the selection of the maintenance work performed on the working target node apparatus by the system administrator. The second selection acceptance screen 72 includes a region 721 for displaying node apparatuses constituting the computer system and the connection relation between the node apparatuses. Each graphic 722 in the region 721 indicates a node apparatus and a solid line between two geometries 722 show that the node apparatus indicated by each of both geometries 722 has connection relationship with each other.

On the second selection acceptance screen 72, a region 723 for displaying the list of names of maintenance works that can be performed on the working target node apparatus is displayed. In the region 723, the name of the maintenance work included in the filtering information 178 is displayed. FIG. 27 shows a case where the working target node apparatus is the node apparatus "FC-SW1" and the region 723 shows the maintenance work that can be performed on the working target node apparatus "FC-SW1" are "module exchange", "power source exchange" and "FC-SW stop". The system administrator can select the maintenance work to be performed on working target node apparatus by, for example, clicking the name of the selection target in the region 723. The client terminal 2 having accepted the selection of the maintenance work transmits data indicating the selected maintenance work to the management apparatus 1.

FIG. 28 is a simulation result screen according to an embodiment.

The simulation result screen 73 is a screen for displaying the range of effect and the phenomenon of the case where the selected maintenance work is performed on the working target node apparatus. The simulation result screen 73 includes a region 731 for displaying node apparatuses constituting the computer system and the connection relation between the node apparatuses. The region 731 includes at least the working target node apparatus and one or more node apparatuses included in the range of effect of the case where the selected maintenance work is performed on the working target node apparatus. Each graphic 732 in the region 731 indicates the node apparatus and the solid line between the two geometries 732 shows the node apparatus indicating that each of both geometries 732 has connection relationship with the other of them.

In the region 731, in the working target node apparatus, display 733 indicating an event related to the selected maintenance work is displayed. The simulation result screen 73 of FIG. 28 shows that the working target node apparatus is FC switch "FC-SW1", an event related to the selected maintenance work is an event "UNREACHABLE" regarding the FC switch "FC-SW1".

Further, in the region 731, in each of one or more node apparatuses included in the range of effect of the case where the selected maintenance work is performed on working target node apparatus, a display 734 indicating the phenomenon of the case where the selected maintenance work is performed on the working target node apparatus is displayed. The simulation result screen 73 of FIG. 28 shows that the node apparatuses included in range of effect of the case where the selected the maintenance work is performed on the working target node apparatus are server apparatus "SERVER 1" and server apparatus "SERVER2", and the phenomenon in the case where the selected maintenance work is performed on the working target node apparatus is an event "disk I/O error" regarding the server apparatus "SERVER 1" and an event "disk I/O error" regarding the server apparatus "SERVER2".

The system administrator, by referring to the simulation result screen 73, can know the range of effect and phenomenon of the case where the selected maintenance work is performed on the working target node apparatus. By this, the system administrator can know in advance what kind of events will occur due to the selected maintenance work and easily determine whether the events notified in the case where the selected maintenance work is performed requires checking, or events that do not require checking (events whose causes are obvious) so that addressing the notified events becomes easy.

The present invention is not limited to the above-described embodiments, and various changes and modifications may be made within the scope of the gist of the present invention. For example, according to the above description, the following expressions of the present invention may be possible.

(Expression 1)

A management method for managing a computer system including a plurality of node apparatuses, comprising:

identifying a first event regarding a first node apparatus estimated to occur when a first maintenance work is performed on the first node apparatus based on maintenance work information indicating a correspondence relationship between each maintenance work of one or more maintenance works for any of the plurality of node apparatuses and an event regarding a node apparatus to be a target of each maintenance work, which is estimated to occur when the maintenance work is performed;

identifying another event to occur when the first event has occurred by performing a simulation based on one or more rules indicating a correspondence relationship between one or more conditional events regarding any of the plurality of node apparatuses and a causal event regarding any of the plurality of node apparatuses to be the cause of the one or more events in the case where the one or more conditional events have occurred; identifying the range of effect and phenomenon of the case where the first maintenance work is performed on the first node apparatus, and displaying the identified range of effect and phenomenon.

(Expression 2)

A management method according to expression 1, wherein the rule is a meta rule for performing management by associating the conditional event with a kind of a node apparatus related to the conditional event while associating the causal event with a kind of a node apparatus related to the causal event, and the management method further comprising:

analyzing the cause of the event having occurred based on the meta rule when an event regarding any of the plurality of node apparatuses occurs.

(Expression 3)

A method according to expression 2, further comprising:

generating an expansion rule in which the kind of the node apparatus related to the conditional event and the kind of the node apparatus related to the causal event are replaced with those of a specific node apparatus based on the meta rule and connection relationship information indicating a connection relationship between the plurality of node apparatuses, and performing the simulation based on the expansion rule.

(Expression 4)

A management method according to expression 3, further comprising:

storing the generated expansion rule in the storage device, wherein at least one of the one or more expansion rules is used for both simulation and analysis of the cause of the event having occurred.

(Expression 5)

A management method according to any one of expressions 1 through 4, wherein the maintenance work information includes, for each maintenance work, data indicating the maintenance work and data indicating the node apparatus to be the target of the maintenance work, and the management method further comprising:

after accepting designation of the first node apparatus, identifying one or more maintenance works on the first node apparatus based on the maintenance work information and displaying data indicating each of the identified one or more maintenance works, and accepting designation of the first maintenance work by accepting selection of one piece of data indicating the displayed one or more maintenance works.

(Expression 6)

A management method according to any one of expressions 1 through 5, wherein in the maintenance work information, one or more events estimated to occur when an event regarding the node apparatus to be the target of the maintenance work occurs are associated with each maintenance work, one or more of the first events are identified based on the maintenance work information, and by performing the simulation for each of one or more of the first events based on the expansion rule, the range of effect and phenomenon of the case where the first maintenance work is performed on the first node apparatus are identified.

(Expression 7)

A management method according to any one of expressions 1 through 6, wherein data indicating the node apparatus to be the target of the maintenance work in the maintenance work information includes data indicating a kind of node apparatus, data indicating a model of the node apparatus, and data indicating a vendor of the node apparatus, and different events are associated with the maintenance works on the node apparatuses to be the target of the maintenance works, of different models or vendors.

(Expression 8)

A management method according to any one of expressions 1 through 7, further comprising:

identifying an expansion rule of one or more of the expansion rules in which the first event is the causal event, and identifying one or more conditional events of the identified expansion rule and node apparatuses related to each of the one or more conditional events of the identified expansion rule, as a range of effect and phenomenon of the case where the first maintenance work is performed on the first node apparatus.

(Expression 9)

A management system configured to perform management of a computer system including a plurality of node apparatuses, comprising:

a storage device; and a control device connected to the storage device, wherein the storage device stores one or more rules indicating a correspondence relationship between one or more conditional events regarding any of the plurality of node apparatuses, and a causal event regarding any of the plurality of node apparatuses to be the cause of one or more conditional events in the case where the conditional events have occurred; and maintenance work information indicating a correspondence relationship between each maintenance work of one or more maintenance works for any of the plurality of node apparatuses and an event regarding a node apparatus to be the target of each maintenance work, which is estimated to occur when the maintenance work is performed, wherein the control device is configured to accept designation of a first maintenance work to be a target of a simulation to be performed and a first node apparatus to be the target of the first maintenance work;

identify a first event regarding the first node apparatus estimated to occur when a first maintenance work is performed on the first node apparatus based on the maintenance work information;

identify another event to occur when the first event occurs, by performing the simulation based on the rule, and identify the range of effect and phenomenon of the case where the first maintenance work is performed on the first node apparatus, and display the identified range of effect and phenomenon.

(Expression 10)

A management system according to expression 9, wherein the rule is a meta rule for performing management by associating the conditional event with a kind of a node apparatus related to the conditional event while associating the causal event with a kind of a node apparatus related to the causal event, and the control device is configured to perform analysis of the cause of the event having occurred based on the meta rule when an event regarding any of the plurality of node apparatuses occurs.

(Expression 11)

A management system according to expression 10, wherein the storage device further stores connection relationship information indicating a connection relationship between the plurality of node apparatuses, and the control device is configured to generate an expansion rule in which the kind of the node apparatus related to conditional event and the kind of the node apparatus related to the causal event are replaced with those of a specific node apparatus, based on the meta rule and the connection relationship information, and perform the simulation based on the expansion rule.

(Expression 12)

A management system according to expression 11, wherein the control device stores the generated expansion rule in the storage device; and at least one of the one or more expansion rules is used for both simulation and analysis of the cause of the event having occurred.

(Expression 13)

A management system according to any one of expressions 9 through 11, wherein the maintenance work information includes, for each maintenance work, data indicating the maintenance work and data indicating the node apparatus to be the target of the maintenance work;

the control device is configured to, after accepting designation of the first node apparatus, identify each of one or more maintenance works on the first node apparatus based on the maintenance work information and display data indicating each of the identified maintenance works, and accept designation of the first maintenance work by accepting selection of one piece of data indicating the displayed one or more maintenance works.

(Expression 14)

The management system according to any one of expressions 9 through 11, wherein in the maintenance work information, one or more events estimated to occur when an event regarding a node apparatus to be the target of the maintenance work occurs are associated with each maintenance work, and the control device is configured to identify one or more of the first events based on the maintenance work information, and identify the range of effect and phenomenon of the case where the first maintenance work is performed on the first node apparatus, by performing the simulation for each of one or more of the first events.

(Expression 15)

A management system according to any one of expressions 9 through 11, wherein data indicating the node apparatus to be the target of the maintenance work in the maintenance work information includes, data indicating kind of the node apparatus, data indicating the model of the node apparatus, and data indicating the vendor of the node apparatus, and different events are associated with the maintenance works on the node apparatuses to be the target of the maintenance works, of different models or vendors.

[Reference Signs List]

1: management apparatus, 2: client terminal, 3: server apparatus, 4: storage apparatus, 5: communication network, 6: network apparatus

The invention claimed is:

1. A management system configured to perform management of a computer system including a plurality of node apparatuses, comprising:
   a storage device; and
   a control device connected to the storage device, wherein
   the storage device stores one or more rules indicating a correspondence relationship between one or more conditional events regarding any of the plurality of node apparatuses, and a causal event regarding any of the plurality of node apparatuses to be the cause of one or more conditional events in the case where the conditional events have occurred; and
   maintenance work information indicating a correspondence relationship between each maintenance work of one or more maintenance works for any of the plurality of node apparatuses and an event regarding a node apparatus to be the target of each maintenance work, which is estimated to occur when the maintenance work is performed, wherein
   the control device is configured to accept designation of a first maintenance work to be a target of a simulation to be performed and a first node apparatus to be the target of the first maintenance work;
   identify a first event regarding the first node apparatus estimated to occur when a first maintenance work is performed on the first node apparatus based on the maintenance work information;
   identify another event to occur when the first event occurs, by performing the simulation based on the rule, and identify the range of effect and phenomenon of the case where the first maintenance work is performed on the first node apparatus, and
   display the identified range of effect and phenomenon.

2. A management system according to claim 1, wherein
   the rule is a meta rule for performing management by associating the conditional event with a kind of a node apparatus related to the conditional event while associating the causal event with a kind of a node apparatus related to the causal event, and
   the control device is configured to perform analysis of the cause of the event having occurred based on the meta rule when an event regarding any of the plurality of node apparatuses occurs.

3. A management system according to claim 2, wherein the storage device further stores connection relationship information indicating a connection relationship between the plurality of node apparatuses, and
   the control device is configured to generate an expansion rule in which the kind of the node apparatus related to conditional event and the kind of the node apparatus related to the causal event are replaced with those of a specific node apparatus, based on the meta rule and the connection relationship information, and
   perform the simulation based on the expansion rule.

4. A management system according to claim 3, wherein the control device is configured to store the generated expansion rule in the storage device; and
   at least one of the one or more expansion rules is used for both simulation and analysis of the cause of the event having occurred.

5. A management system according to claim 1, wherein
   the maintenance work information includes, for each maintenance work, data indicating the maintenance work and data indicating the node apparatus to be the target of the maintenance work;
   the control device is configured to, after accepting designation of the first node apparatus, identify each of one or more maintenance works on the first node apparatus based on the maintenance work information and display data indicating each of the identified maintenance works, and
   accept designation of the first maintenance work by accepting selection of one piece of data indicating the displayed one or more maintenance works.

6. The management system according to claim 1, wherein
   in the maintenance work information, one or more events estimated to occur when an event regarding a node apparatus to be the target of the maintenance work occurs are associated with each maintenance work, and
   the control device is configured to identify one or more of the first events based on the maintenance work information, and identify the range of effect and phenomenon of the case where the first maintenance work is performed on the first node apparatus, by performing the simulation for each of one or more of the first events.

7. A management system according to claim 1, wherein data indicating the node apparatus to be the target of the maintenance work in the maintenance work information includes data indicating the kind of the node apparatus, data indicating the model of the node apparatus, and data indicating the vendor of the node apparatus, and
   different events are associated with the maintenance works on the node apparatuses to be the target of the maintenance works, of different models or vendors.

* * * * *